(12) United States Patent
Yoshii

(10) Patent No.: US 7,750,662 B2
(45) Date of Patent: Jul. 6, 2010

(54) ELECTRO-OPTICAL DEVICE AND ELECTRONIC APPARATUS

(75) Inventor: Masahito Yoshii, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/237,188

(22) Filed: Sep. 24, 2008

(65) Prior Publication Data
US 2009/0079464 A1    Mar. 26, 2009

(30) Foreign Application Priority Data
Sep. 25, 2007    (JP)    ............... 2007-246685

(51) Int. Cl.
*G01R 31/00* (2006.01)
(52) U.S. Cl. .................................. 324/770
(58) Field of Classification Search ......... 324/770; 349/149–152; 345/87, 92
See application file for complete search history.

(56) References Cited

U.S. PATENT DOCUMENTS

| | | |
|---|---|---|
| 5,671,026 A | 9/1997 | Shiraki et al. |
| 5,828,428 A | 10/1998 | Kim et al. |
| 6,088,073 A * | 7/2000 | Hioki et al. ............ 349/40 |
| 6,784,862 B2 * | 8/2004 | Kodate et al. ............ 345/92 |
| 6,879,367 B2 * | 4/2005 | Ukita .................. 349/149 |
| 2004/0252269 A1 | 12/2004 | Murade |
| 2005/0258769 A1 | 11/2005 | Imamura |
| 2007/0002509 A1 | 1/2007 | Kumagai et al. |

FOREIGN PATENT DOCUMENTS

| | | |
|---|---|---|
| JP | 06-232345 | 8/1994 |
| JP | 2007-079541 | 3/2007 |

* cited by examiner

*Primary Examiner*—Ha Tran T Nguyen
*Assistant Examiner*—Arleen M Vazquez
(74) *Attorney, Agent, or Firm*—Workman Nydegger

(57) ABSTRACT

An electro-optical device includes a peripheral circuit that is provided in a peripheral area, a terminal that is provided in the peripheral area; and an electric wiring pattern that provides an electric connection between the terminal and the peripheral circuit, the electric wiring pattern having a low resistance portion and a high resistance portion, the high resistance portion having a winding layout in a terminal-overlapping area of the peripheral area at which the terminal is formed when viewed in plan.

4 Claims, 10 Drawing Sheets

ELECTRO-OPTICAL DEVICE AND ELECTRONIC APPARATUS

BACKGROUND

1. Technical Field

The present invention relates to an electro-optical device such as a liquid crystal device or the like. In addition, the invention further relates to an electronic apparatus that is provided with an electro-optical device. An example of a variety of electronic apparatuses to which the invention can be applied includes but not limited to a liquid crystal projector.

2. Related Art

As a typical example thereof, an electro-optical device of the related art has the following configuration. A plurality of pixel units (i.e., pixels) is formed in a pixel region (i.e., pixel area) over an array/element substrate. A peripheral region (i.e., peripheral area) surrounds the pixel region. A variety of peripheral circuits such as a driving circuit and a test circuit, though not limited thereto, are provided in the peripheral region. The driving circuit provides a driving force to the plurality of pixels for the operation thereof. The test circuit is used for testing the electro-optical device. A plurality of external connection terminals such as external circuit connection terminals and test terminals is provided at the peripheral region. The plurality of external connection terminals is used for the purpose of supplying various kinds of signals from the outside to the peripheral circuits. For example, an external device/circuit that is electrically connected to some of the external connection terminals supplies an input signal to the peripheral circuit. The plurality of external connection terminals is also used for the purpose of outputting a signal from the peripheral circuit to the outside (e.g., external device). An example of an electro-optical device of the related art that has the configuration described above is described in JP-A-2007-79541.

An electro-optical device of the related art that has the external connection terminals described above is susceptible to electrostatic damage. For example, if electrostatic charges are generated near an electro-optical device of the related art and then applied to any external connection terminal thereof to reach a peripheral circuit thereof without any intention to do so, which might occur accidentally during the assembly of the electro-optical device, during the testing thereof, or during the shipment thereof or other transportation thereof, the circuit characteristics (e.g., operation performance, though not limited thereto) of the peripheral circuit may be degraded, or even worse, the peripheral circuit may be electro-statically damaged. As a known technical solution to such an electro-static problem, a resistance/resistive element is typically provided on an electric wire/line that is connected to the external connection terminal at its one end and the peripheral circuit at its other end. The resistance element that is provided on the electric wire between the external connection terminal and the peripheral circuit protects the peripheral circuit against electro-static damage. An example of such a configuration is described in the above-identified JP-A-2007-79541.

However, the resistance element described above has the following disadvantage. The resistance element is formed as, for example, a part of the electric wire extending between the external connection terminal and the peripheral circuit. The part of the electric wire that is formed as the resistance element between the external connection terminal and the peripheral circuit is made of a relatively high resistance material such as conductive polysilicon, though not limited thereto. The part of the electric line that is formed as the resistance element between the external connection terminal and the peripheral circuit has a pattern that is formed in the peripheral region. Accordingly, the size of a layout area at which the resistance element is formed in the entire area over the substrate is relatively large, which makes it practically impossible or at best difficult to make the size of an electro-optical device of the related art smaller. That is, because of a comparatively large pattern size of the part of the electric wire that is formed as the resistance element between the external connection terminal and the peripheral circuit, an electro-optical device of the related art has a technical difficulty in reducing the size thereof.

SUMMARY

An advantage of some aspects of the invention is to provide an electro-optical device that has a reduced size while effectively preventing the occurrence of electro-static damage. In addition, the invention further provides, as an advantage of some aspects thereof, an electronic apparatus that is provided with such an electro-optical device.

In order to address the above-identified problem without any limitation thereto, the invention provides, as a first aspect thereof, an electro-optical device that includes: a substrate; a plurality of pixel units that is arrayed in a pixel area over the substrate; a peripheral circuit that is provided in a peripheral area that is formed around the pixel area over the substrate, the peripheral circuit supplying a signal to each of the plurality of pixel units; a plurality of terminals that is provided in the peripheral area; and an electric wiring pattern that provides an electric connection between the terminal and the peripheral circuit, the electric wiring pattern having a low resistance portion and a high resistance portion, the high resistance portion having a higher resistance than that of the low resistance portion, wherein at least a part of the high resistance portion of the electric wiring pattern is formed in a layer that is separated from another layer in which the terminal is formed with an interlayer insulation film being formed between the first-mentioned layer in which the above-mentioned at least a part of the high resistance portion of the electric wiring pattern is formed and the second-mentioned layer in which the terminal is formed; and the above-mentioned at least a part of the high resistance portion of the electric wiring pattern has a winding layout in a terminal-overlapping area of the peripheral area at which the terminal is formed when viewed in plan.

In the configuration of an electro-optical device according to the first aspect of the invention described above, a plurality of pixel units (e.g., pixels) is arrayed in, for example, a matrix pattern that is made up of a plurality of rows and a plurality of columns with a predetermined inter-pixel pitch, that is, with a predetermined inter-pixel distance each therebetween. The plurality of pixel units is formed in a pixel area or, in other words, a pixel-array area over a substrate. In the following DESCRIPTION OF EXEMPLARY EMBODIMENTS of this specification, the term "image display region" or "image display area" is used as a non-limiting specific example of the pixel area. A peripheral area is formed around the pixel area over the substrate. A variety of peripheral circuits are provided in the peripheral area. For example, a selection circuit (or a demultiplexer), a scanning line driving circuit, and a test circuit are formed as peripheral circuits in the peripheral area over the substrate, though not limited thereto. In addition, various kinds of external connection terminals are formed in the peripheral area over the substrate. The plurality of external connection terminals is arrayed in the peripheral area along at least one edge/side of the substrate, though the scope of the invention is not limited to such a configuration. A few examples of the variety of external connection terminals are external circuit connection terminals and test terminals, though not necessarily limited thereto. The external circuit connection terminals are electrically connected to at least one external circuit. Each of test terminals is used for either inputting or outputting a test signal (including but not limited to a test output signal, a test-related input signal, or other kind of signal used for the purpose of testing) for testing whether the electro-optical device is in a good condition (e.g., OK, in a good operation state, or in good quality, though not limited thereto) or in a bad condition (e.g., NG, in a poor operation state, or in poor quality, though not limited thereto). At the time of the driving operation of an electro-optical device, external circuits supply various kinds of signals to the variety of external connection terminals. For example, at the time of the display operation of an electro-optical device, an external circuit supplies an image signal (i.e., video signal) to some of external connection terminals. At the time of the test operation of an electro-optical device, external circuits supply, for example, a clock signal, a control signal, and a power signal to some of external connection terminals. Each of these various kinds of signals supplied by the external circuits to the variety of external connection terminals flows through an electric wiring pattern, which provides an electric connection between the terminal and the peripheral circuit, and then is supplied to the peripheral circuit. Upon reception of, or in response to, these various kinds of signals supplied from the external circuits, the peripheral circuits drive the pixel units via a plurality of scanning lines and a plurality of data lines, though not limited thereto. As a result thereof, an electro-optical device displays an image in the pixel area in an active-matrix driving scheme.

In the configuration of an electro-optical device according to the first aspect of the invention described above, the electric wiring pattern has a low resistance portion and a high resistance portion. The high resistance portion of the electric wiring pattern has a higher resistance than that of the low resistance portion thereof. More specifically, for example, the electric wiring pattern is made up of the low resistance portion that contains aluminum (Al) without any limitation thereto and the high resistance portion that contains conductive polysilicon without any limitation thereto. In other words, the high resistance portion of the electric wiring pattern provides an additional resistance to that offered by the low resistance portion thereof, which has a lower resistance than that of the high resistance portion thereof. Since the electric wiring pattern has such a structure, a signal that is applied to the external connection terminal flows through the high resistance portion of the electric wiring pattern before it is supplied to the peripheral circuit. Therefore, the high resistance portion of the electric wiring pattern makes it possible to completely prevent any excessive voltage from being applied to the peripheral circuit, which is electrically connected to the electric wiring pattern, or at least substantially reduce the risk thereof. For example, even if electrostatic charges are generated near an electro-optical device according to the first aspect of the invention described above and then applied to the electric wiring pattern thereof without any intention to do so, which might occur accidentally during the assembly of the electro-optical device according to the first aspect of the invention described above, during the testing thereof, or during the shipment thereof or other transportation thereof, the high resistance portion of the electric wiring pattern makes it possible to completely prevent any excessive voltage from being applied to the peripheral circuit, which is electrically connected to the electric wiring pattern, or at least substantially reduce the risk thereof. More specifically, the high resistance portion of the electric wiring pattern makes it possible to, even when such electrostatic charges are applied thereto, completely prevent any excessive voltage from being applied to any of the thin film transistors of the peripheral circuit or at least substantially reduce the risk thereof. Therefore, it is possible to completely prevent the peripheral circuit from being damaged due to electrostatic charges that are applied to the electric wiring pattern or at least substantially reduce the risk thereof. In other words, the high resistance portion of the electric wiring pattern functions as an electrostatic protection resistor, which protects the peripheral circuit against any electrostatic damage. Thus, the high resistance portion of the electric wiring pattern significantly improves the electrostatic resistance of an electro-optical device according to the first aspect of the invention described above.

In the configuration of an electro-optical device according to the first aspect of the invention described above, at least a part of the high resistance portion of the electric wiring pattern is formed in a layer that is separated from another layer in which the terminal is formed with an interlayer insulation film being formed between the first-mentioned layer in which the above-mentioned at least a part of the high resistance portion of the electric wiring pattern is formed and the second-mentioned layer in which the terminal is formed. In addition, in the configuration of an electro-optical device according to the first aspect of the invention described above, the above-mentioned at least a part of the high resistance portion of the electric wiring pattern has a winding layout in a terminal overlapping area of the peripheral area at which the terminal is formed when viewed in plan. As a typical example of the layer/lamination structure of an electro-optical device according to the first aspect of the invention described above, the above-mentioned at least a part of the high resistance portion of the electric wiring pattern is formed in a layer under/below another layer in which the terminal is formed with at least one interlayer insulation film being formed between the first-mentioned layer in which the above-mentioned at least a part of the high resistance portion of the electric wiring pattern is formed and the second-mentioned layer in which the terminal is formed. In addition, as a typical example of the layer/lamination structure thereof, the above-mentioned at least a part of the high resistance portion of the electric wiring pattern is electrically connected to the terminal through at least one contact hole that is formed through the above-mentioned at least one interlayer insulation film. Moreover, in the configuration of an electro-optical device according to the first aspect of the invention described above, the above-mentioned at least a part of the high resistance portion of the electric wiring pattern has a winding layout in a terminal-overlapping area of the peripheral area at which the terminal is formed when viewed in plan. That is, the above-mentioned at least a part of the high resistance portion of the electric wiring pattern overlaps the terminal when viewed in plan over the substrate. That is, when viewed in plan over the substrate, the above-mentioned at least a part of the high resistance portion of the electric wiring pattern is formed in a winding layout in the terminal-overlapping area of the peripheral area at which the terminal is formed so that the resistance value of the high resistance portion of the electric wiring pattern approximates to a predetermined resistance value. Or, in other words, when viewed in plan over the substrate, since the above-mentioned at least a part of the high resistance portion of the electric wiring pattern has a winding layout inside the terminal-overlapping area of the peripheral area at which the terminal is formed, the resistance value of the above-mentioned at least a part of the high resistance portion of the electric wiring pattern is increased (e.g., heightened). For this reason, it is possible to reduce the area (i.e., area size) of other part of the high resistance portion of the electric wiring pattern that is formed in a remaining peripheral area excluding the terminal-overlapping area of the peripheral area at which the terminal is formed, when viewed in plan over the substrate, which is required so as to ensure that the high resistance portion of the electric wiring pattern has a predetermined resistance value. That is, while ensuring that the high resistance portion of the electric wiring pattern has a predetermined resistance value, it is possible to reduce the area of other part of the high resistance portion of the electric wiring pattern that is formed in the terminal "non-overlapping" area of the peripheral area at which the terminal is not formed when viewed in plan over the substrate. Since it is possible to reduce the layout area of the above-mentioned other part of the high resistance portion of the electric wiring pattern, it is further possible to make the area size of the peripheral area smaller relative to the size of the pixel area when viewed in plan over the substrate. This makes it further possible to reduce the size of the substrate without narrowing the pixel area. Or, in other words, it is possible to "shrink" the size/structure of the substrate. Thus, thanks to the unique layout/pattern/structure of the high resistance portion of the electric wiring pattern explained above, an electro-optical device according to the first aspect of the invention described above has a reduced size, which is advantageous.

As explained above, if the configuration of an electro-optical device according to the first aspect of the invention is adopted, it is possible to completely prevent the peripheral circuit from being damaged due to electrostatic charges that are applied to the electric wiring pattern or at least substantially reduce the risk thereof. Especially if the configuration of an electro-optical device according to the first aspect of the invention is adopted, it is possible to form a larger number of half-finished electro-optical devices on a single mother substrate without any necessity to increase the area size of the single mother substrate. In a known process of manufacturing an electro-optical device of the related art, a plurality of half-finished electro-optical devices is formed on a single mother substrate. After the formation of the plurality of half-finished electro-optical devices thereon, the single mother substrate is divided into a plurality of substrate pieces. In this way, a plurality of finished electro-optical devices is manufactured out of the single mother substrate. In such a manufacturing process, typically, more than a dozen of or dozens of half-finished electro-optical devices are formed on a single mother substrate. Therefore, even a very small reduction in the half-finished substrate size of each of these electro-optical devices that are formed on a single mother substrate by a few millimeters or just one millimeter or less could make it possible to increase the number of rows of the half-finished electro-optical devices that are formed on the single mother substrate and/or the number of columns thereof. That is, such a very small reduction in the half-finished substrate size thereof might make it possible to increase the number of rows/columns of the half-finished electro-optical devices by one row/column or more. Therefore, in a practical sense, even a very small reduction in the half-finished substrate size of each of a plurality of electro-optical devices that are formed on a single mother substrate is very advantageous, contributing greatly to production cost efficiency.

In the configuration of an electro-optical device according to the first aspect of the invention described above, it is preferable that the plurality of terminals should be formed as external circuit connection terminals each of which is electrically connected to an external circuit.

With such a preferred configuration of an electro-optical device according to the first aspect of the invention described above, it is possible to completely prevent the peripheral circuit, which is electrically connected to the external circuit connection terminals, from being damaged due to electrostatic charges that are applied to the electric wiring pattern or at least substantially reduce the risk thereof. In addition, with such a preferred configuration of an electro-optical device according to the first aspect of the invention described above, it is possible to reduce the area (i.e., area size) of other part of the high resistance portion of the electric wiring pattern that is formed in a remaining peripheral area excluding the external-circuit-connection-terminal overlapping area of the peripheral area at which the external circuit connection terminal (which is electrically connected to the electric wiring pattern) is formed, when viewed in plan over the substrate, which is required so as to ensure that the high resistance portion of the electric wiring pattern has a predetermined resistance value. That is, while ensuring that the high resistance portion of the electric wiring pattern has a predetermined resistance value, it is possible to reduce the area of other part of the high resistance portion of the electric wiring pattern that is formed in the external-circuit-connection-terminal "non-overlapping" area of the peripheral area at which the external circuit connection terminal is not formed when viewed in plan over the substrate.

In the configuration of an electro-optical device according to the first aspect of the invention described above, it is preferable that the plurality of terminals should be formed as test terminals each of which is used for either inputting or outputting a test signal for testing whether the electro-optical device is in a good condition or in a bad condition.

With such a preferred configuration of an electro-optical device according to the first aspect of the invention described above, it is possible to completely prevent the peripheral circuit, which is electrically connected to the test terminals, from being damaged due to electrostatic charges that are applied to the electric wiring pattern or at least substantially reduce the risk thereof. In addition, with such a preferred configuration of an electro-optical device according to the first aspect of the invention described above, it is possible to reduce the area (i.e., area size) of other part of the high resistance portion of the electric wiring pattern that is formed in a remaining peripheral area excluding the test-terminal overlapping area of the peripheral area at which the test terminal (which is electrically connected to the electric wiring pattern) is formed, when viewed in plan over the substrate, which is required so as to ensure that the high resistance portion of the electric wiring pattern has a predetermined resistance value. That is, while ensuring that the high resistance portion of the electric wiring pattern has a predetermined resistance value, it is possible to reduce the area of other part of the high resistance portion of the electric wiring pattern that is formed in the test-terminal "non-overlapping" area of the peripheral area at which the test terminal is not formed when viewed in plan over the substrate.

In order to address the above-identified problem without any limitation thereto, the invention provides, as a second aspect thereof, an electronic apparatus that is provided with an electro-optical device according to the first aspect of the invention, which has any of the configurations described above, including its preferred or modified configurations.

According to an electronic apparatus of this aspect of the invention, it is possible to embody various kinds of electronic devices that are capable of achieving a size reduction, including but not limited to, a projection-type display device, a television, a mobile phone, an electronic personal organizer, a word processor, a viewfinder-type video tape recorder, a direct-monitor-view-type video tape recorder, a workstation, a videophone, a POS terminal, a touch-panel device, and so forth, because the electronic apparatus of this aspect of the invention is provided with the electro-optical device according to the above-described aspect of the invention. In addition, as an example of an electronic apparatus of this aspect of the invention, it is possible to embody an electrophoresis apparatus such as a sheet of electronic paper. Further in addition, as another example of an electronic apparatus of this aspect of the invention, it is possible to embody a variety of electron emission devices such as a field emission display (FED), a surface-conduction electron-emitter display (SED), and the like. Furthermore, as still another example of an electronic apparatus of this aspect of the invention, it is possible to embody a variety of display devices that adopts such an electrophoresis apparatus or an electron emission device.

These and other features, operations, and advantages of the present invention will be fully understood by referring to the following detailed description of exemplary embodiments in conjunction with the accompanying drawings.

BRIEF DESCRIPTION OF THE DRAWINGS

The invention will be described with reference to the accompanying drawings, wherein like numbers reference like elements.

FIG. 8 illustrates, in a partial close-up plan view, a test terminal area shown as a dotted box A0 in FIG. 7.

FIG. 9 illustrates, in a partial close-up plan view, two test terminals shown as a dotted box Al in FIG. 8.

DESCRIPTION OF EXEMPLARY EMBODIMENTS

With reference to the accompanying drawings, an exemplary embodiment of the present invention is described below. In the following exemplary embodiment of the invention, a liquid crystal device that conforms to a TFT active-matrix driving scheme is taken as an example of various kinds of electro-optical devices according to some aspects of the invention.

First Embodiment

With reference to FIGS. 1-10, a liquid crystal device according to a first exemplary embodiment of the invention is explained below.

Figure 1:
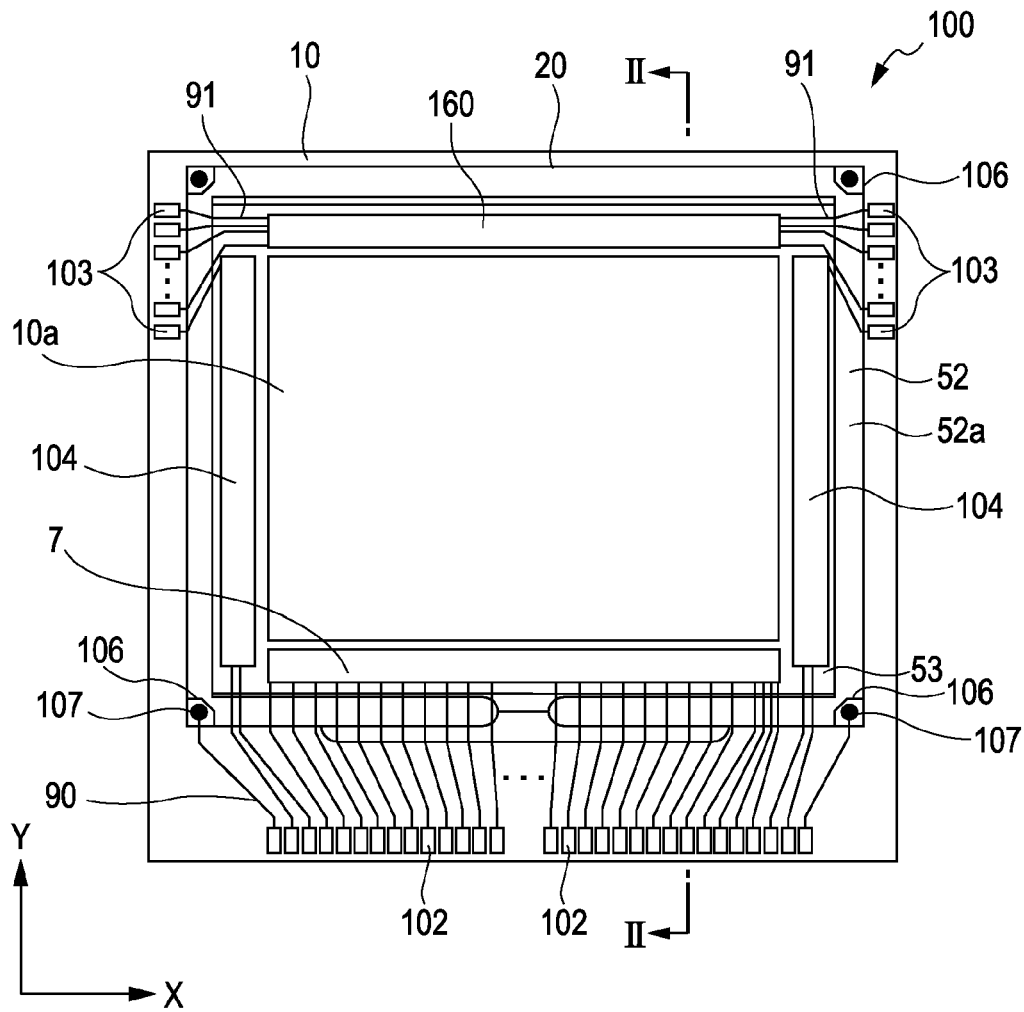
FIG. 1 is a plan view that schematically illustrates an example of the general configuration of a liquid crystal device according to a first exemplary embodiment of the invention.
Figure 2:
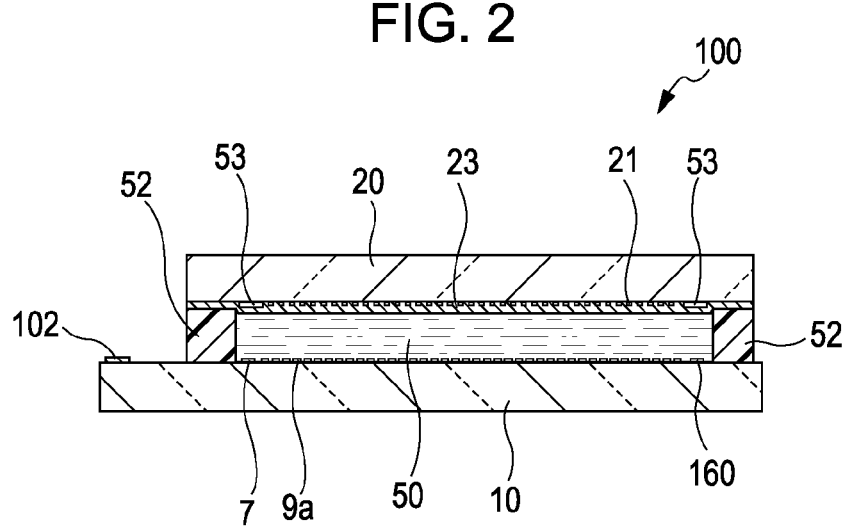
FIG. 2 is a sectional view taken along the line II-II of FIG. 1.

First of all, an example of the general configuration of a liquid crystal device according to the present embodiment of the invention is explained below while referring to FIGS. 1 and 2. FIG. 1 is a plan view that schematically illustrates an example of the configuration of a TFT array substrate and various components formed or deposited thereon, which are viewed from a certain point at the counter-substrate side, or from above the counter substrate. FIG. 2 is a sectional view taken along the line II-II of FIG. 1.

As shown in FIGS. 1 and 2, in the configuration of a liquid crystal device 100 according to the present embodiment of the invention, a TFT array substrate 10 and a counter substrate (which may be referred to as "opposite substrate" in the following description) 20 are arranged opposite to each other. The TFT array substrate 10 has a size larger than that of the counter substrate 20 when viewed in plan. Specifically, as illustrated in the plan view of FIG. 1, at least an area portion of the TFT array substrate 10 is exposed, that is, not covered by the counter substrate 20, as viewed from a certain point at the counter-substrate side when the TFT array substrate 10 and the counter substrate 20 are provided so as to face each other. Or, in other words, at least an area portion of the TFT array substrate 10 protrudes with respect to (i.e., as viewed from) the corresponding edge(s) of the counter substrate 20 when viewed in plan.

A liquid crystal layer 50 is sealed between the TFT array substrate 10 and the counter substrate 20. The TFT array substrate 10 and the counter substrate 20 are bonded to each other with the use of a sealant material 52 that is provided at a sealing region 52a around an image display region (i.e., image display area) 10a. The image display region 10a is an example of a "pixel area" according to an aspect of the invention. That is, the liquid crystal layer 50 is sealed between the TFT array substrate 10 and the counter substrate 20 inside the image display area 10a that is surrounded by the sealing material 52.

The sealant material 52 is made from, for example, an ultraviolet (UV) curable resin, a thermosetting resin, or the like, which functions to paste these substrates together. In the production process of the liquid crystal device 100 according to the present embodiment of the invention, the sealant material 52 is applied onto the TFT array substrate 10 and subsequently hardened through ultraviolet irradiation treatment, heat treatment, or any other appropriate treatment. A gap material such as glass fibers, glass beads, or the like, are scattered in the sealant material 52 so as to set the distance (i.e., inter-substrate gap) between the TFT array substrate 10 and the counter substrate 20 at a predetermined gap value.

Inside the sealing region 52a at which the sealant material 52 is provided and in parallel therewith, a picture frame light-shielding film 53, which has light-shielding property and defines the picture-frame region of the image display region 10a, is provided on the counter substrate 20 as illustrated in FIG. 1. Notwithstanding the above, however, a part or a whole of the picture frame light-shielding film 53 may be provided at the TFT-array-substrate (10) side as a built-in light-shielding film. In the configuration of the liquid crystal device 100 according to the present embodiment of the invention, a peripheral region surrounds the image display region 10a. The peripheral region is an example of a "peripheral area" according to an aspect of the invention. In other words, in the configuration of the liquid crystal device 100 according to the present embodiment of the invention, an area that is farther than the picture frame light-shielding film 53 when viewed from the center of the TFT array substrate 10, that is, an area that is not inside but outside the picture frame light-shielding film 53, is defined as the peripheral region.

A plurality of external circuit connection terminals 102 is provided at a peripheral region outside the sealing region 52a at which the sealant material 52 is provided in such a manner that the external circuit connection terminals 102 are arrayed along one of four sides of the TFT array substrate 10. Or, more specifically, the external circuit connection terminals 102 are arrayed along the exposed side of the protruding area portion of the TFT array substrate 10 that is not covered by the counter substrate 20 as viewed from a certain point at the counter-substrate (20) side. The external circuit connection terminals 102 include but not limited to image signal terminals each of which an image signal is supplied to. In the following description of this specification, the term "video signal terminal" may be used in place of image signal terminal. In like manner, in the following description of this specification, the term "video signal" may be used in place of image signal. In the configuration of the liquid crystal device 100 according to the present embodiment of the invention, the external circuit connection terminals 102 are aligned along the lower edge (i.e., lower side) of the TFT array substrate 10 shown in the plan view of FIG. 1, which is the above-mentioned exposed side of the protruding area portion of the TFT array substrate 10 that is not covered by the counter substrate 20 as viewed from a certain point at the counter-substrate (20) side. The protruding area portion of the TFT array substrate 10 has a rectangular area shape that has a longer side extending in a horizontal direction as the exposed side thereof mentioned above.

A demultiplexer 7 is provided at a region that is elongated inside the sealing region 52a (not in the sealing region 52a) at which the sealant material 52 is provided. The demultiplexer 7 is provided in substantially parallel with the exposed side of the protruding area portion of the TFT array substrate 10 in such a manner that the picture frame light-shielding film 53 covers the demultiplexer 7. That is, the demultiplexer 7 is provided in substantially parallel with the above-mentioned one of four sides of the TFT array substrate 10 along which the external circuit connection terminals 102 are arrayed. A pair of scanning line driving circuits 104 is provided inside the sealing region 52a along two of four sides thereof that are not in parallel with the above-mentioned one side in such a manner that each of the scanning line driving circuits 104 is covered by the picture frame light-shielding film 53. In addition to the above, a test circuit 160 is provided along the remaining one side of the TFT array substrate 10, which is parallel with the first-mentioned one side thereof. The test circuit 160 is provided in a region inside the sealing region 52a. The picture frame light-shielding film 53 covers the test circuit 160. A plurality of test terminals 103 is electrically connected to the test circuit 160. In the following description of this specification as well as in the recitation of appended claims, the term "test terminal" has the meaning of a testing terminal or a terminal that is used for test purpose or used at the time of test operation, though not necessarily limited thereto. The plurality of test terminals 103 is provided along the second-mentioned two of four sides of the TFT array substrate 10 along which the pair of scanning-line driving circuits 104 is provided. The plurality of test terminals 103 is arrayed outside a vertical part of the sealing region 52a that extends along each of these two of four sides of the TFT array substrate 10. That is, in the configuration of the liquid crystal device 100 according to the present embodiment of the invention, the plurality of test terminals 103 is arrayed in edge regions that are elongated along the left side of the TFT array substrate 10 and the right side thereof as shown in the plan view of FIG. 1.

Inter-substrate conductive terminals 106, which connect the TFT array substrate 10 with the counter substrate 20 by means of inter-substrate conductive material 107, are provided on the TFT array substrate 10 at positions corresponding to four corners of the counter substrate 20, respectively. With such a structure, it is possible to establish electric conduction between the TFT array substrate 10 and the counter substrate 20. An electric wiring pattern 90, which is made up of a plurality of electric wires/lines, is formed over the TFT array substrate 10. The electric wiring pattern 90 provides electric connection between some of the external circuit connection terminals 102 and the demultiplexer 7. In addition, the electric wiring pattern 90 provides electric connection between some of the external circuit connection terminals 102 and the scanning-line driving circuits 104. Moreover, the electric wiring pattern 90 provides electric connection between some of the external circuit connection terminals 102 and the inter-substrate conductive terminals 106. The electric connection provided by the electric wiring pattern 90 is not necessarily limited to those described above. In addition to the electric wiring pattern 90 explained above, another electric wiring pattern 91, which is made up of a plurality of electric wires/lines, is formed over the TFT array substrate 10. The electric wiring pattern 91 provides electric connection between some of the test terminals 103 and the test circuit 160 as well as between some of the test terminals 103 and the scanning line driving circuits 104. The electric connection provided by the electric wiring pattern 91 is not necessarily limited to those described above.

Though not specifically illustrated in FIG. 2, a layered structure that includes laminations of TFTs for pixel switching, which are driver elements, and of wirings such scanning lines, data lines, and so on, is formed on the TFT array substrate 10. In the image display region 10a, pixel electrodes 9a are provided at a layer over the wiring structure of the pixel-switching TFTs, the scanning lines, the data lines, and the like. An alignment film (i.e., orientation film) is deposited on the pixel electrodes 9a. On the other hand, a light-shielding film 23 is deposited on the surface of the counter substrate 20 opposite the TFT array substrate 10. The counter electrode 21, which is made of a transparent material such as indium tin oxide (ITO) or the like, is deposited on the light-shielding film 23 in a "solid" manner, that is, as a solid electrode that covers the whole area. Accordingly, the solid counter electrode 21 is formed opposite to the plurality of pixel electrodes 9a. Another alignment film is deposited on the counter electrode 21. The liquid crystal layer 50 is made of liquid crystal that consists of, for example, a mixture of one or more types of nematic liquid crystal element. Such liquid crystal takes a predetermined orientation state between a pair of the above orientation films (i.e., alignment films).

A lamination of a polarizing film/plate and a phase difference retardation film, though not limited thereto, is provided, with a predetermined orientation, at each of the incoming-light side of the counter substrate 20 and the outgoing-light side of the TFT array substrate 10 depending on a variety of operation modes such as a TN (twisted nematic) mode, an STN (super twisted nematic) mode, and a D-STN (double super twisted nematic) mode, or a normally white mode/normally black mode, though not limited thereto.

Figure 3:
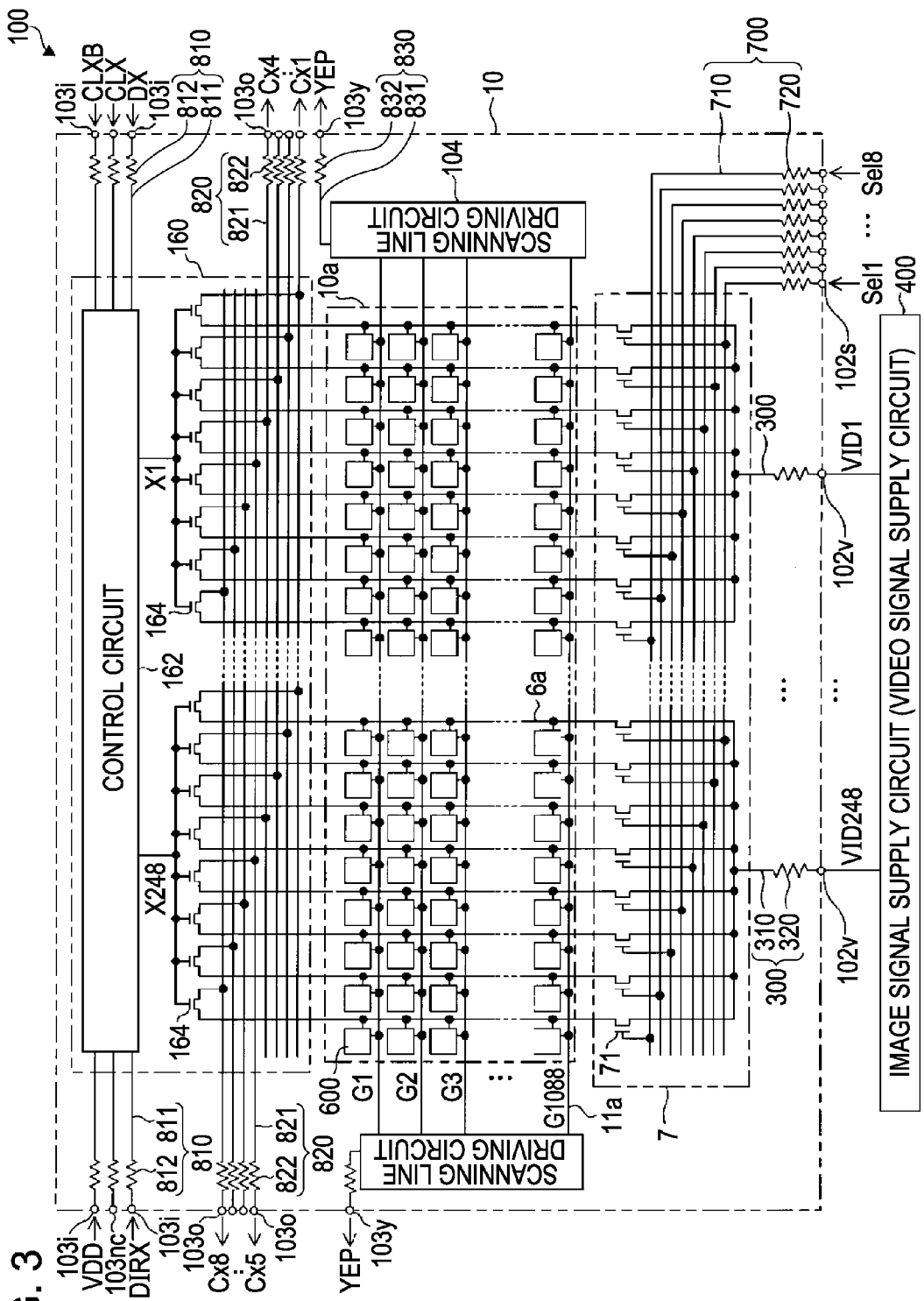
FIG. 3 is a block diagram that schematically illustrates an example of the electric configuration of a liquid crystal device according to the first exemplary embodiment of the invention.
Figure 4:
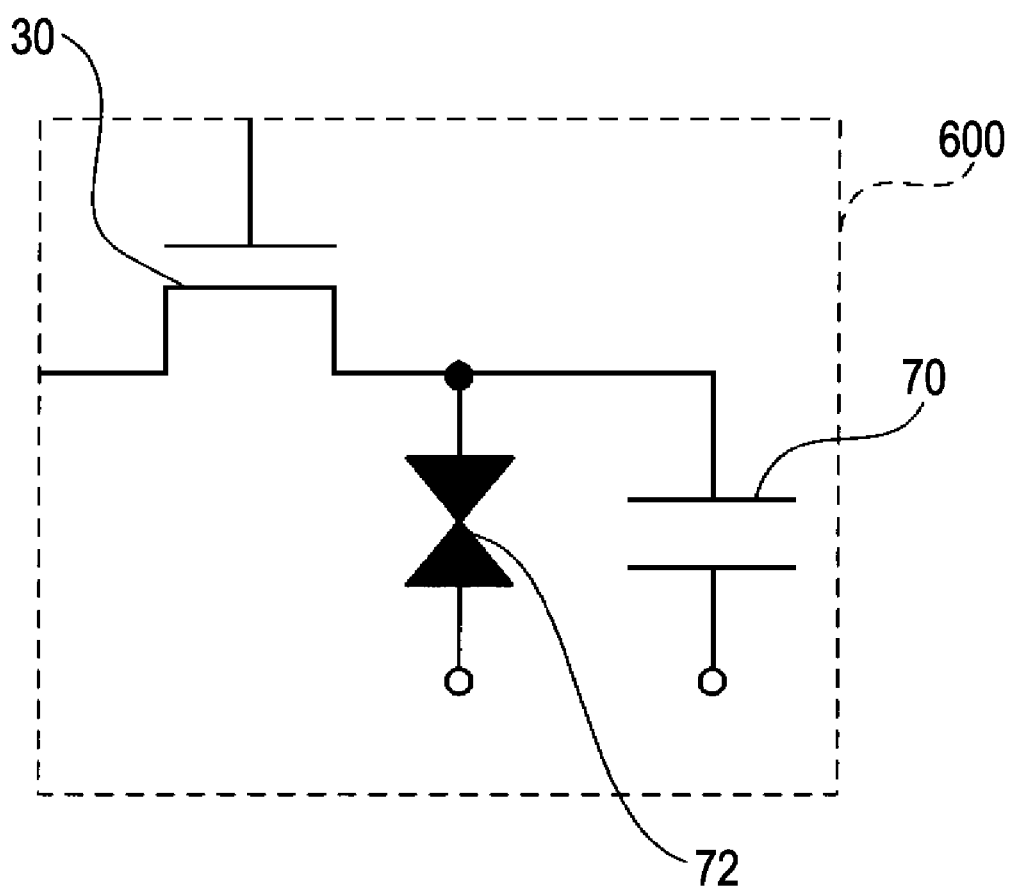
FIG. 4 is an equivalent circuit diagram that schematically illustrates, as an example thereof, the circuit configuration of one of a plurality of pixel units (e.g., pixels) of a liquid crystal device according to the first exemplary embodiment of the invention.

Next, with reference to FIGS. 3 and 4, the specific configuration of a liquid crystal device according to the present embodiment of the invention is explained below. FIG. 3 is a block diagram that schematically illustrates an example of the electric configuration of a liquid crystal device according to an exemplary embodiment of the invention. FIG. 4 is an equivalent circuit diagram that schematically illustrates, as an example thereof, the circuit configuration of one of a plurality of pixel units (e.g., pixels) of a liquid crystal device according to an exemplary embodiment of the invention.

As illustrated in FIG. 3, the liquid crystal device 100 is provided with the demultiplexer 7, the scanning line driving circuit 104, and the test circuit 160. The demultiplexer 7, the scanning line driving circuit 104, and the test circuit 160 are formed over the TFT array substrate 10 thereof. Some of the external circuit connection terminals 102 are formed as video signal terminals (i.e., image signal terminals) 102*v* over the TFT array substrate 10. A video signal supply circuit (i.e., image signal supply circuit) 400 is electrically connected to the plurality of video signal terminals 102*v*. The video-signal supply circuit 400 is provided as an external circuit that is separated from the TFT array substrate 10.

One thousand eighty-eight (1,088) rows of scanning lines 11*a* are formed in the image display area 10*a* over the TFT array substrate 10. Each of 1,088 rows of the scanning lines 11*a* extends in the X direction. On the other hand, 1,984 columns of data lines 6*a* are formed in the image display area 10*a* over the TFT array substrate 10. Each of 1,984 columns of the data lines 6*a* extends in the Y direction. These 1,984 columns of data lines 6*a* are divided into 248 groups each of which is made up of eight data lines 6*a* (248×8=1,984). These data lines 6*a* and the scanning lines 11*a* are electrically insulated from each other over the TFT array substrate 10. Notwithstanding the above, however, the number of the scanning lines 11*a* is not limited to 1,088. The number of the data lines 6*a* is not limited to 1,984. Although it is explained that the number of the data lines 6*a* that make up each group is eight, the technical scope of the invention is not limited to such an exemplary configuration. That is, the number of the data lines 6*a* that make up each group may be modified into any integral number greater than one.

A plurality of pixel units 600 is arrayed at positions corresponding to the intersections of the above-explained 1,088 scanning lines 11*a* and the above-explained 1,984 data lines 6*a*. Therefore, in the configuration of the liquid crystal device 100 according to the present embodiment of the invention, the plurality of pixel units 600 is arrayed in a matrix pattern that has 1,088 rows and 1,984 columns with a predetermined inter-pixel pitch, that is, with a predetermined inter-pixel distance each therebetween.

As shown in FIG. 4, each of the plurality of pixel units 600 is provided with a pixel-switching TFT 30, a liquid crystal element 72, and a storage capacitor 70.

The source electrode of the pixel-switching TFT 30 is electrically connected to the data line 6*a*. The gate electrode of the pixel-switching TFT 30 is electrically connected to the scanning line 11*a*. The drain electrode of the pixel-switching TFT 30 is electrically connected to the pixel electrode 9*a* of the liquid crystal element 72, a more detailed explanation of which will be given later. The operation state of the pixel-switching TFT 30 is switched over between ON and OFF in accordance with a scanning signal that is supplied from the scanning line driving circuit 104.

The liquid crystal element 72 is made up of a pixel electrode 9*a*, a counter electrode 21, and liquid crystal. The liquid crystal is sandwiched between the pixel electrode 9*a* and the counter electrode 21. A data signal having a predetermined signal level is supplied through the data line 6*a* to the pixel electrode 9*a* of the liquid crystal element 72. After being written into the liquid crystal of the liquid crystal element 72 via the pixel electrode 9*a* thereof, the data signal having a predetermined signal level is held for a certain time period between the pixel electrode 9*a* of the liquid crystal element 72 and the counter electrode 21 thereof. Liquid crystal changes its orientation and/or its order of molecular association depending on the level of a voltage that is applied thereto. By this means, it modulates light to realize a gradation display. Under a "normally-white" mode, the optical transmittance (i.e., light transmission factor) with respect to an incident light beam decreases in accordance with a voltage applied on a pixel-by-pixel basis (i.e., to each pixel), whereas, under a "normally-black" mode, the optical transmittance with respect to an incident light beam increases in accordance with a voltage applied on a pixel-by-pixel basis. Thus, when viewed as a whole, light having a certain contrast in accordance with an image signal is emitted from the liquid crystal device 100.

In order to prevent the leakage of an image signal being held between the pixel electrode 9*a* and the counter electrode 21, the aforementioned storage capacitor 70 is added in electrically parallel with a liquid crystal capacitor that is formed between the pixel electrode 9*a* and the counter electrode 21.

The liquid crystal device 100 according to the present embodiment of the invention has the plurality of pixel units 600 each of which has a circuit configuration explained above. The plurality of pixel units 600 is arrayed in a matrix pattern in the image display area 10*a* thereof. Therefore, the liquid crystal device 100 according to the present embodiment of the invention can be operated in an active-matrix driving scheme.

Referring back to FIG. 3, an example of the electric configuration of the liquid crystal device 100 is further explained. In the following description of an exemplary embodiment of the invention, eight data lines 6*a* that belong to the same single group may be called as "a-column" data line 6*a*, "b-column" data line 6*a*, "c-column" data line 6*a*, "d-column" data line 6*a*, "e-column" data line 6*a*, "f-column" data line 6*a*, "g-column" data line 6*a*, and "h-column" data line 6*a* for the purpose of distinguishing them from one another. The same series of reference alphabets "a, b, c, d, e, f, g, and h" is assigned to each of all 248 groups of the data lines 6*a*. The reference alphabet "a" is assigned to the rightmost one of eight data lines 6*a* of each group. The reference alphabet "b" is assigned to the second one from the right. The reference alphabet "c" is assigned to the third one from the right. The reference alphabet "d" is assigned to the fourth one from the right. The reference alphabet "e" is assigned to the fifth one from the right. The reference alphabet "f" is assigned to the sixth one from the right. The reference alphabet "g" is assigned to the seventh one from the right. Finally, the reference alphabet "h" is assigned to the leftmost one of eight data lines 6a of each group. Accordingly, the a-column data lines 6a correspond to the 1st, 9th, 17th, . . . , and 1977th data lines 6a counted from the right. The b-column data lines 6a correspond to the 2nd, 10th, 18th, . . . , and 1978th data lines 6a counted from the right. The c-column data lines 6a correspond to the 3rd, 11th, 19th, . . . , and 1979th data lines 6a counted from the right. The d-column data lines 6a correspond to the 4th, 12th, 20th, . . . , and 1980th data lines 6a counted from the right. The e-column data lines 6a correspond to the 5th, 13th, 21st, . . . , and 1981st data lines 6a counted from the right. The f-column data lines 6a correspond to the 6th, 14th, 22nd, . . . , and 1982nd data lines 6a counted from the right. The g-column data lines 6a correspond to the 7th, 15th, 23rd, . . . , and 1983rd data lines 6a counted from the right. Finally, the h-column data lines 6a correspond to the 8th, 16th, 24th, . . . , and 1984th data lines 6a counted from the right.

The scanning line driving circuit 104 has a shift register. The scanning-line driving circuit 104 supplies scanning signals G1, G2, G3, . . . , and G1088 to the first, second, third, . . . , and 1088th scanning lines 11a, respectively. More specifically, the scanning line driving circuit 104 selects, in a sequential order, the first, second, third, . . . , 1088th scanning lines 11a during the time period of one frame. The scanning line driving circuit 104 sets the level of a scanning signal that is to be supplied to the selected signal line at a high level H while setting the level of scanning signals that are to be supplied to other non-selected signal lines at a low level L. Herein, the high level of a scanning signal that is to be supplied to the selected signal line corresponds to a selected voltage (level), whereas the low level of scanning signals that are to be supplied to other non-selected signal lines corresponds to a non-selected voltage (level).

The video signal supply circuit 400, which is provided as an external circuit that is separated from the TFT array substrate 10, becomes electrically connected to the TFT array substrate 10 via the video signal terminals 102v at the time of the display operation of the liquid crystal device 100. The image signal supply circuit (i.e., video signal supply circuit) 400 outputs an image signal to the pixel electrode 9a that corresponds to the intersection of the scanning line 11a that is selected by the scanning line driving circuit 104 and one of eight data lines 6a of each group that is selected by the demultiplexer 7. The image signal that is supplied by the image signal supply circuit to each selected pixel electrode 9a has a voltage level that corresponds to the gradation (e.g., gray scale) of the pixel that has the selected pixel electrode 9a. The electric wiring pattern 90 that is shown in FIG. 1 includes a plurality of image signal lines 300. In the following description of this specification, the term "video signal lines" may be used in place of image signal lines. The image signals that are outputted from the image signal supply circuit 400 to the image signal terminals 102v are supplied to the demultiplexer 7 through the image signal lines 300 of the electric wiring pattern 90. In the configuration of the liquid crystal device 100 according to the present embodiment of the invention, each of the image signal lines 300 has a (relatively) low resistance line portion 310 and a (relatively) high resistance line portion 320, the latter of which has a higher resistance than that of the former. Having such a line configuration, each of the image signal lines 300 makes it possible to completely prevent the demultiplexer 7 from being damaged electrostatically, or at least substantially reduce the risk thereof. A more detailed explanation of the structure of the low resistance line portion 310 of the image signal line 300 and the high resistance line portion 320 thereof will be given later.

At the time of the test operation of the liquid crystal device 100, a test image signal supply circuit becomes electrically connected to the TFT array substrate 10 via the video signal terminals 102v in place of the above-mentioned non-test image signal supply circuit 400, which is provided as an external circuit that is separated from the TFT array substrate 10. The test image signal supply circuit supplies test image signals thereto for testing the liquid crystal device 100.

As has already been described above, in the configuration of the liquid crystal device 100 according to the present embodiment of the invention, the number of columns of data lines 6a is 1,984, which are divided into 248 groups each of which is made up of eight data lines 6a. Accordingly, the number of the image signal terminals 102v is 248.

The demultiplexer 7 has a plurality of TFTs 71 each of which is provided for the corresponding one of the data lines 6a. Each of the TFTs 71 is formed as an n-channel transistor. The drain electrode of each of the TFTs 71 is connected to one end of the corresponding one of the data lines 6a. The image signal lines 300 are provided so as to correspond to the groups of the data lines 6a. The source electrodes of eight TFTs 71 that are connected to, at the drain-electrode side thereof, the corresponding data lines 6a that belong to the same single group are "common-connected" to the corresponding image signal line 300. The same holds true for each of 248 groups thereof.

As will be understood from the foregoing explanation, the m-th (where "m" is any positive integer from 1 inclusive through 248 inclusive) group of the data lines 6a is made up of (8m−7)th data line, (8m−6)th data line, (8m−5)th data line, (8m−4)th data line, (8m−3)th data line, (8m−2)th data line, (8m−1)th data line, and (8m)th data line. Note that these (8m−7)th data line, (8m−6)th data line, (8m−5)th data line, (8m−4)th data line, (8m−3)th data line, (8m−2)th data line, (8m−1)th data line, and (8m)th data line correspond to the aforementioned a-column data line, b-column data line, c-column data line, d-column data line, e-column data line, f-column data line, g-column data line, and h-column data line, respectively. The source electrodes of eight TFTs 71 that are connected to, at the drain-electrode side thereof, the corresponding data lines 6a that belong to the same single group are common-connected to the corresponding image signal line 300. An image signal (i.e., video signal) VID (m) is supplied to the m-th group of the data lines 6a. The electric wiring pattern 90 that is shown in FIG. 1 includes a plurality of control signal lines 700. A control signal Sel 1 is supplied through one of the control signal lines 700 to the gate electrode of the TFT 71 of the (8m−7)th data line 6a. A control signal Sel 2 is supplied through one of the control signal lines 700 to the gate electrode of the TFT 71 of the (8m−6)th data line 6a. A control signal Sel 3 is supplied through one of the control signal lines 700 to the gate electrode of the TFT 71 of the (8m−5)th data line 6a. A control signal Sel 4 is supplied through one of the control signal lines 700 to the gate electrode of the TFT 71 of the (8m−4)th data line 6a. A control signal Sel 5 is supplied through one of the control signal lines 700 to the gate electrode of the TFT 71 of the (8m−3)th data line 6a. A control signal Sel 6 is supplied through one of the control signal lines 700 to the gate electrode of the TFT 71 of the (8m−2)th data line 6a. A control signal Sel 7 is supplied through one of the control signal lines 700 to the gate electrode of the TFT 71 of the (8m−1)th data line 6a. A control signal Sel 8 is supplied through one of the control signal lines 700 to the gate electrode of the TFT 71 of the (8m)th data line 6a. Some of the external circuit connection terminals 102 are formed as control signal terminals (e.g., selection signal terminals) 102s over the TFT array substrate 10. A timing control circuit, which is not shown in the drawing, is electrically connected to the plurality of control signal terminals 102s. The timing control circuit is provided as an external circuit that is separated from the TFT array substrate 10. The timing control circuit supplies control signals Sel 1, Sel 2, . . . , and Sel 8 to the control signal lines 700 via the respective control signal terminals 102s. In the configuration of the liquid crystal device 100 according to the present embodiment of the invention, the control signal line 700 has a structure that is the same as or similar to that of the image signal line 300. That is, each of the control signal lines 700 has a (relatively) low resistance line portion 710 and a (relatively) high resistance line portion 720, the latter of which has a higher resistance than that of the former. Having such a line configuration, each of the control signal lines 700 makes it possible to completely prevent the demultiplexer 7 from being damaged electrostatically, or at least substantially reduce the risk thereof. A more detailed explanation of the structure of the low resistance line portion 710 of the control signal line 700 and the high resistance line portion 720 thereof will be given later.

As shown in FIG. 3, the test circuit 160 has a control circuit 162 and a plurality of TFTs 164 each of which is provided for the corresponding one of the data lines 6a.

The control circuit 162 has a shift register. A test control circuit, which is not illustrated in the drawing, is provided as an external circuit. The electric wiring pattern 91 that is shown in FIG. 1 includes a plurality of test signal lines 810. At the time of the testing operation of the liquid crystal device 100, a transfer start pulse DX, a clock signal CLX, a reverse (i.e., inverse) clock signal CLXB, a transfer direction control signal DIRX, and a power potential (i.e., voltage) VDD are supplied to the control circuit 162. These signals are inputted into the control circuit 162 via test terminals 103i of the aforementioned test terminals 103 and through the test signal lines 810 of the electric wiring pattern 91. During the testing operation of the liquid crystal device 100, the control circuit 162 shifts the transfer start pulse DX in accordance with the transfer direction control signal DIRX, the clock signal CLX, and the reverse clock signal CLXB in a sequential manner so as to output transfer pulses X1, X2, . . . , and X248 to the TFTs 164 of the 248 groups of the data lines 6a, respectively. In the configuration of the liquid crystal device 100 according to the present embodiment of the invention, each of the test signal lines 810 has a (relatively) low resistance line portion 811 and a (relatively) high resistance line portion 812, the latter of which has a higher resistance than that of the former. Having such a line configuration, each of the test signal lines 810 makes it possible to completely prevent the test circuit 160 from being damaged electro-statically, or at least substantially reduce the risk thereof. More specifically, each of the test signal lines 810 makes it possible to completely prevent TFTs of the control circuit 162 of the test circuit 160 from being damaged electro-statically, or at least substantially reduce the risk thereof. A more detailed explanation of the structure of the low resistance line portion 811 of the test signal line 810 and the high resistance line portion 812 thereof will be given later.

Each of the TFTs 164 is formed as an n-channel transistor. The source electrode of each of the TFTs 164 is connected to the other end of the corresponding one of the data lines 6a. That is, the source electrode of each of the TFTs 164 is connected to the other end of the corresponding one of the data lines 6a that is opposite to the aforementioned one end thereof to which the drain electrode of the corresponding TFT 71 of the demultiplexer 7 is connected. The gate electrodes of eight TFTs (164) that are connected to, at the source-electrode side thereof, the corresponding data lines 6a that belong to the same single group are common-connected to the control circuit 162. The same holds true for each of 248 groups thereof. The control circuit 162 supplies a transfer pulse Xm to the m-th group of the data lines 6a.

That is, the control circuit 162 supplies, as a common pulse, a transfer pulse Xm to the gate electrodes of eight TFTs 164 that are connected to, at the source-electrode side thereof, the corresponding data lines 6a that belong to the same single m-th group, which is made up of (8m−7)th data line 6a, (8m−6)th data line 6a, (8m−5)th data line 6a, (8m−4)th data line 6a, (8m−3)th data line 6a, (8m−2)th data line 6a, (8m−1)th data line 6a, and (8m)th data line 6a.

Eight test signal lines 820, the number of which is the same as the number of the data lines 6a that make up each group, are connected to the drain electrodes of the TFTs 164. More specifically, the drain electrode of the TFT 164 that corresponds to the a-column data line 6a in each of 248 groups is connected to one of these eight test signal lines 820. A test output signal that is read out as a signal Cx1 is outputted through the above-mentioned one test signal line 820. That is, the drain electrodes of the a-column TFTs 164 of the 1st, 2nd, 3rd, . . . , 248th groups are common-connected thereto. In like manner, the drain electrodes of the b-column TFTs 164 (i.e., the TFTs 164 that correspond to the b-column data lines 6a) of the 1st, 2nd, 3rd, . . . , 248th groups are common-connected to one of these eight test signal lines 820 through which a test output signal that is read out as a signal Cx2 is outputted. The drain electrodes of the c-column TFTs 164 of the 1st, 2nd, 3rd, . . . , 248th groups are common-connected to one of these eight test signal lines 820 through which a test output signal that is read out as a signal Cx3 is outputted. The drain electrodes of the d-column TFTs 164 of the 1st, 2nd, 3rd, . . . , 248th groups are common-connected to one of these eight test signal lines 820 through which a test output signal that is read out as a signal Cx4 is outputted. The drain electrodes of the e-column TFTs 164 of the 1st, 2nd, 3rd, . . . , 248th groups are common-connected to one of these eight test signal lines 820 through which a test output signal that is read out as a signal Cx5 is outputted. The drain electrodes of the f-column TFTs 164 of the 1st, 2nd, 3rd, . . . , 248th groups are common-connected to one of these eight test signal lines 820 through which a test output signal that is read out as a signal Cx6 is outputted. The drain electrodes of the g-column TFTs 164 of the 1st, 2nd, 3rd, . . . , 248th groups are common-connected to one of these eight test signal lines 820 through which a test output signal that is read out as a signal Cx7 is outputted. The drain electrodes of the h-column TFTs 164 of the 1st, 2nd, 3rd, . . . , 248th groups are common-connected to one of these eight test signal lines 820 through which a test output signal that is read out as a signal Cx8 is outputted. The plurality of test signal lines 820 is included in the electric wiring pattern 91 that is shown in FIG. 1. The test signal lines 820 are electrically connected to the test terminals 103o of the test terminals 103 that are shown in FIG. 1. In the configuration of the liquid crystal device 100 according to the present embodiment of the invention, the test signal line 820 has a structure that is the same as or similar to that of the test signal line 810, which will be described in detail later. That is, each of the test signal lines 820 has a (relatively) low resistance line portion 821 and a (relatively) high resistance line portion 822, the latter of which has a higher resistance than that of the former. Having such a line configuration, each of the test signal lines 820 makes it possible to completely prevent the test circuit 160 from being damaged electro-statically, or at least substantially reduce the risk thereof. More specifically, each of the test signal lines 820 makes it possible to completely prevent the TFTs 164 of the test circuit 160 from being damaged electro-statically, or at least substantially reduce the risk thereof.

During the testing operation of the liquid crystal device 100, the control circuit 162 of the test circuit 160 having the circuit configuration described above outputs the transfer pulses X1, X2, . . . , X248 to the 1st, 2nd, . . . , 248th groups of the data lines 6a respectively so as to put the operation state of the TFTs 164 of the respective groups into an ON state. By this means, the electric potentials (i.e., voltages) of the data lines 6a to which test image signals having a predetermined voltage level have been supplied are outputted to these eight test signal lines 820. A judgment circuit, which is provided as an external circuit, is electrically connected to these eight test signal lines 820. The judgment circuit makes a judgment as to whether the electric potentials of these eight test signal lines 820 are at predetermined levels or not. As a result thereof, a decision is made as to whether the demultiplexer 7 and each of the data lines 6a are in a good condition (e.g., OK, in a good operation state, or in good quality, though not limited thereto) or in a bad condition (e.g., NG, in a poor operation state, or in poor quality, though not limited thereto). As will be described in detail later, the above-explained test is conducted with various kinds of TFT-array-substrate-side elements/components/lines/patterns/members formed over a single mother substrate. Or, in other words, it is tested whether the demultiplexer 7 and each of the data lines 6a are good or bad before the mother substrate is divided into a plurality of liquid crystal devices 100.

Each of two test terminals 103y of the test terminals 103 (refer to FIG. 1) is provided so as to output, from the corresponding scanning line driving circuit 104, a test output signal that is read out as a signal YEP at the time of the testing operation of the liquid crystal device 1. The electric wiring pattern 91 that is shown in FIG. 1 includes a plurality of test signal lines 830. The test terminal 103y is electrically connected to the scanning line driving circuit 104 through the test signal line 830. More specifically, the test terminal 103y is electrically connected to the output line of the last output stage of the shift register provided in the scanning line driving circuit 104. At the time when the liquid crystal device 1 is tested, the test terminals 103y are probed so as to examine the scanning line driving circuits 104. In the configuration of the liquid crystal device 100 according to the present embodiment of the invention, each of the test signal lines 830 has a (relatively) low resistance line portion 831 and a (relatively) high resistance line portion 832, the latter of which has a higher resistance than that of the former. Having such a line configuration, each of the test signal lines 830 makes it possible to completely prevent the corresponding scanning line driving circuit 104 from being damaged electro-statically, or at least substantially reduce the risk thereof. More specifically, each of the test signal lines 830 makes it possible to completely prevent TFTs of the corresponding scanning line driving circuit 104 from being damaged electro-statically, or at least substantially reduce the risk thereof. A more detailed explanation of the structure of the low resistance line portion 811 of the test signal line 810 and the high resistance line portion 812 of the test signal line 810, which has a structure that is the same as or similar to that of the test signal line 830, will be given later.

Among the plurality of test terminals 103 that is shown in FIG. 1, a test terminal 103nc is allocated as an unused terminal. Each of the test terminals 103i is electrically connected to the control circuit 162 of the test circuit 160 through the corresponding one of the test signal lines 810, and so is the unused test terminal 103nc.

In the following description, the operation of the liquid crystal device 100 having the configuration described above is explained while referring to FIG. 3.

The scanning line driving circuit 104 sets the level of the scanning signals G1, G2, . . . , G1088 at a high level in a sequential and exclusive manner at the lapse of each one horizontal time period throughout a certain frame, which may be hereafter referred to as the "n-th" frame. That is, the scanning line driving circuit 104 sets the level of the scanning signals G1, G2, . . . , G1088 at the aforementioned selected voltage level in a sequential manner while not selecting others for each one horizontal time period throughout the n-th frame.

Herein, control signals Sel 1, Sel 2, . . . , Sel 8 that are supplied from the aforementioned timing control circuit are sequentially and exclusively set at the H level in the order of appearance herein in each one horizontal time period. In synchronization with the supplying of the control signals Sel 1, Sel 2, . . . , Sel 8 from the timing control circuit, the image signal supply circuit 400 supplies image signals VID 1, VID 2, VID 3, . . . , and VID 248.

Specifically, during a time period in which the signal level of the scanning signal Gi, which is applied to the i-th row, is set at the H level, the image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the electric potential of the counter electrode 21, which is denoted as LCCOM, by the level of a voltage that is in accordance with the gradation (e.g., gray scale) of the pixel that is provided at a position corresponding to the intersection of the i-th scanning line 11a and the a-column data line 6a of each group. Since the control signal Sel 1 (only) is initially set at the H level, the a-column data line 6a of each group is selected. That is, the a-column TFT 71 only, which corresponds to the a-column data line 6a, turns ON in each group because the control signal Sel 1 only is currently set at the H level. As a result thereof, the image signals VID 1, VID 2, VID 3, . . . , and VID 248 that are outputted by the image signal supply circuit 400 are supplied to the a-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 1st, 9th, 17th, . . . , and 1977th data lines 6a counted from the right. On the other hand, when the scanning signal Gi is set at the H level, the operation state of each of the pixel-switching TFTs 30 of the corresponding one of the pixels aligned in the i-th row becomes conductive (i.e., turns ON). Therefore, the image signals VID 1, VID 2, VID 3, . . . , and VID 248 that are outputted by the image signal supply circuit 400 and then supplied to the a-column data lines 6a of the 1st, 2nd, 3rd, . . . , 248th groups, respectively, are applied to the 1st, 9th, 17th, . . . , and 1977th pixel electrodes 9a counted from the right in the i-th row, respectively.

Next, the control signal Sel 2 is set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the b-column data line 6a of each group. Since the control signal Sel 2 is now set at the H level, the b-column data line 6a of each group is selected. That is, the b-column TFT 71 only, which corresponds to the b-column data line 6a, turns ON in each group because the control signal Sel 2 only is currently set at the H level. As a result thereof, the image signals VID 1, VID 2, VID 3, . . . , and VID 248 that are outputted by the image signal supply circuit 400 are supplied to the b-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 2nd, 10th, 18th, . . . , and 1978th data lines 6a counted from the right. On the other hand, since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the b-column data lines 6a of the 1st, 2nd, 3rd, . . . , 248th groups, respectively, are applied to the 2nd, 10th, 18th, . . . , and 1978th pixel electrodes 9a counted from the right in the i-th row, respectively.

Next, the control signal Sel 3 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the c-column data line 6a of each group. Next, the control signal Sel 4 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the d-column data line 6a of each group. Next, the control signal Sel 5 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the e-column data line 6a of each group. Next, the control signal Sel 6 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the f-column data line 6a of each group. Next, the control signal Sel 7 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the g-column data line 6a of each group. Finally, the control signal Sel 8 is set at the H level while the scanning signal Gi, which is applied to the i-th row, is currently set at the H level. The image signal supply circuit 400 outputs image signals VID 1, VID 2, VID 3, . . . , and VID 248 to the 1st, 2nd, 3rd, . . . , 248th groups of the data lines 6a at the same time, respectively. Each of the image signals VID 1, VID 2, VID 3, . . . , and VID 248 is either higher or lower than the counter-electrode electric potential LCCOM by the level of a voltage that is in accordance with the gradation of the pixel that is provided at a position corresponding to the intersection of the i-th scanning line 11a and the h-column data line 6a of each group. At the time when the control signal Sel 3 is set at the H level, the c-column data line 6a of each group is selected. That is, the c-column TFT 71 only, which corresponds to the c-column data line 6a, turns ON in each group because the control signal Sel 3 only is currently set at the H level. As a result thereof, the image signals VID 1, VID 2, VID 3, . . . , and VID 248 that are outputted by the image signal supply circuit 400 are supplied to the c-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 3rd, 11th, 19th, . . . , and 1979th data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the c-column data lines 6a of the 1st, 2nd, 3rd, . . . , 248th groups, respectively, are applied to the 3rd, 11th, 19th, . . . , and 1979th pixel electrodes 9a counted from the right in the i-th row, respectively. At the time when the control signal Sel 4 is set at the H level, the d-column data line 6a of each group is selected. That is, the d-column TFT 71 only, which corresponds to the d-column data line 6a, turns ON in each group because the control signal Sel 4 only is currently set at the H level. As a result thereof, the image signals VID 1, VID 2, VID 3, . . . , and VID 248 that are outputted by the image signal supply circuit 400 are supplied to the d-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 4th, 12th, 20th, . . . , and 1980th data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the d-column data lines 6a of the 1st, 2nd, 3rd, . . . , 248th groups, respectively, are applied to the 4th, 12th, 20th, . . . , and 1980th pixel electrodes 9a counted from the right in the i-th row, respectively. At the time when the control signal Sel 5 is set at the H level, the e-column data line 6a of each group is selected. That is, the e-column TFT 71 only, which corresponds to the e-column data line 6a, turns ON in each group because the control signal Sel 5 only is currently set at the H level. As a result thereof, the image signals VID 1, VID 2, VID 3, . . . , and VID 248 that are outputted by the image signal supply circuit 400 are supplied to the e-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 5th, 13th, 21st, . . . , and 1981st data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the e-column data lines 6a of the 1st, 2nd, 3rd, . . . , 248th groups, respectively, are applied to the 5th, 13th, 21st, . . . , and 1981st pixel electrodes 9a counted from the right in the i-th row, respectively. At the time when the control signal Sel 6 is set at the H level, the f-column data line 6a of each group is selected. That is, the f-column TFT 71 only, which corresponds to the f-column data line 6a, turns ON in each group because the control signal Sel 6 only is currently set at the H level. As a result thereof, the image signals VID 1, VID 2, VID 3, . . . , and VID 248 that are outputted by the image signal supply circuit 400 are supplied to the f-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 6th, 14th, 22nd, . . . , and 1982nd data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the f-column data lines 6a of the 1st, 2nd, 3rd, . . . , 248th groups, respectively, are applied to the 6th, 14th, 22nd, . . . , and 1982nd pixel electrodes 9a counted from the right in the i-th row, respectively. At the time when the control signal Sel 7 is set at the H level, the g-column data line 6a of each group is selected. That is, the g-column TFT 71 only, which corresponds to the g-column data line 6a, turns ON in each group because the control signal Sel 7 only is currently set at the H level. As a result thereof, the image signals VID 1, VID 2, VID 3, . . . , and VID 248 that are outputted by the image signal supply circuit 400 are supplied to the g-column data lines 6a of the 1st, 2nd, 3rd, . . . , 248th groups, respectively. This means that the image signals VID 1, VID 2, VID 3, . . . , and VID 248 that are outputted by the image signal supply circuit 400 are supplied to the 7th, 15th, 23rd, . . . , and 1983rd data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the g-column data lines 6a of the 1st, 2nd, 3rd, . . . , 248th groups, respectively, are applied to the 7th, 15th, 23rd, . . . , and 1983rd pixel electrodes 9a counted from the right in the i-th row, respectively. Finally, at the time when the control signal Sel 8 is set at the H level, the h-column data line 6a of each group is selected. That is, the h-column TFT 71 only, which corresponds to the h-column data line 6a, turns ON in each group because the control signal Sel 8 only is currently set at the H level. As a result thereof, the image signals VID 1, VID 2, VID 3, . . . , and VID 248 that are outputted by the image signal supply circuit 400 are supplied to the h-column data lines 6a of the 1st, 2nd, 3rd, . . . , 248th groups, respectively. This means that the image signals VID 1, VID 2, VID 3, and VID 248 that are outputted by the image signal supply circuit 400 are supplied to the 8th, 16th, 24th, . . . , and 1984th data lines 6a counted from the right. Since the scanning signal Gi is currently set at the H level, the operation state of each of the pixel-switching TFTs 30 of the corresponding one of the pixels aligned in the i-th row is conductive. Therefore, the image signals VID 1, VID 2, VID 3, . . . , and VID 248 that are outputted by the image signal supply circuit 400 and then supplied to the h-column data lines 6a of the 1st, 2nd, 3rd, . . . , 248th groups, respectively, are applied to the 8th, 16th, 24th, . . . , and 1984th pixel electrodes 9a counted from the right in the i-th row, respectively.

In this way, the operation of writing the gradation-dependent voltages of image signals is completed for all pixels that are arrayed in the i-th row. It should be noted that voltages applied to the pixel electrodes 9a are kept by the aforementioned liquid crystal capacitors until the next (n+1) frame even after the level of the scanning signal Gi has turned to low (L).

Figure 5:
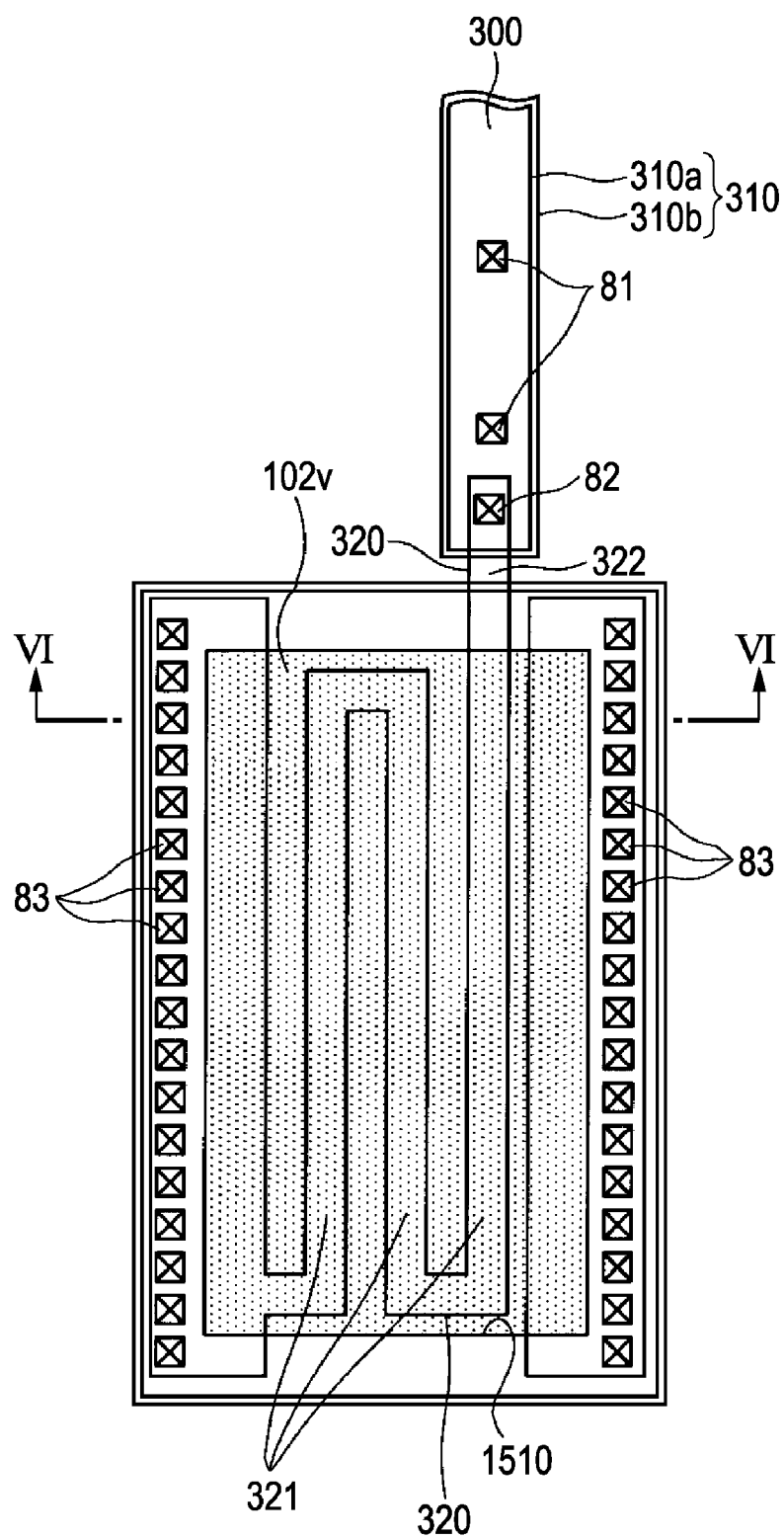
FIG. 5 is a plan view that schematically illustrates an example of the layout of one of a plurality of image signal lines of a liquid crystal device according to the first exemplary embodiment of the invention.
Figure 6:
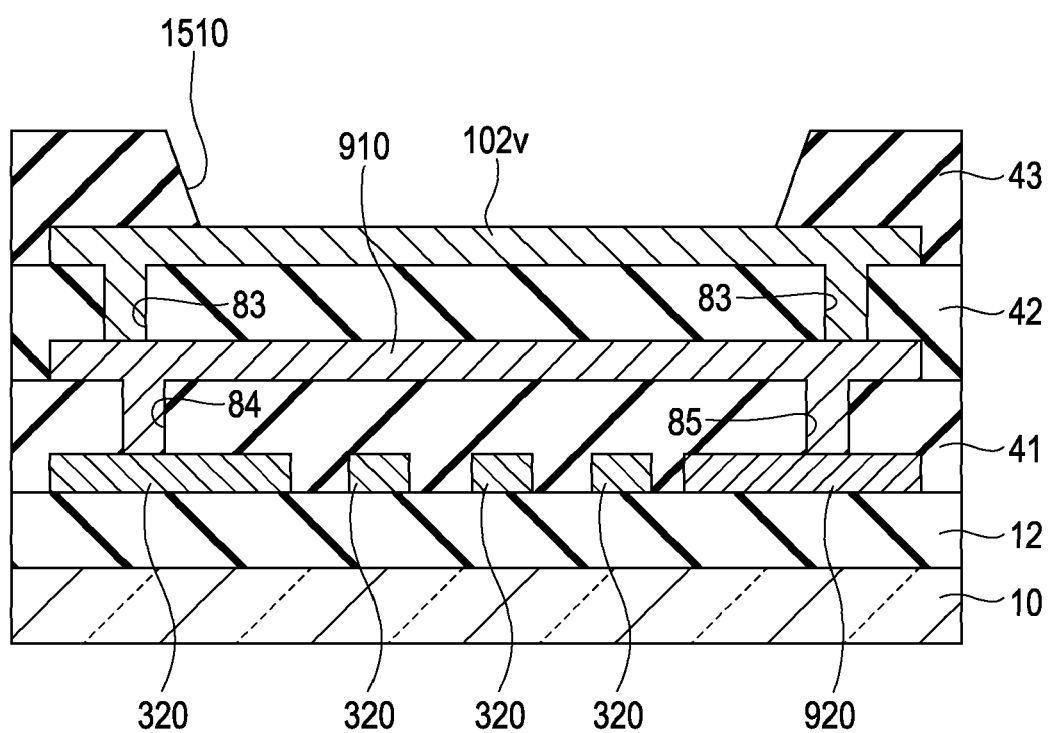
FIG. 6 is a sectional view taken along the line VI-VI of FIG. 5.

Next, with reference to FIGS. 5 and 6 as well as FIG. 3, an explanation is given of the specific layout and structure of an electric wiring pattern (90) that is electrically connected to a plurality of external circuit connection terminals (102) in the configuration of the liquid crystal device 100 according to the present embodiment of the invention. In the following description of this specification, the term "winding electric wiring pattern" will be used in place of the aforementioned "electric wiring pattern". The meaning of the term "winding" will become clear from the following detailed description of the present embodiment of the invention in conjunction with the accompanying drawings. In addition, in the following description of this specification, one of the image signal lines 300 is taken as an example of a plurality of winding electric wires/lines that make up the winding electric wiring pattern 90. Note that each of the plurality of the image signal lines 300 is electrically connected to the corresponding one of the plurality of the image signal terminals 102v among the plurality of external circuit connection terminals 102. Any electric wire/line component of the winding electric wiring pattern 90 other than the above-mentioned image signal line 300 has substantially the same layout and structure as those of the image signal line 300. For example, the aforementioned control signal line 700, which is included in the winding electric wiring pattern 90, has a pattern/layout/structure that is the same as or similar to that of the image signal line 300.

FIG. 5 is a plan view that schematically illustrates an example of the layout of the image signal line 300 of the liquid crystal device 100 according to the present embodiment of the invention. FIG. 6 is a sectional view taken along the line VI-VI of FIG. 5. The high resistance line portion 320 of the image signal line 300 has a pattern that is unique to the present embodiment of the invention. Accordingly, FIG. 5 illustrates, in an enlarged plan view, the layout of the high resistance line portion 320 of the image signal line 300 in the configuration of the liquid crystal device 100 according to the present embodiment of the invention.

As illustrated in FIGS. 3 and 5, each of the plurality of image signal lines 300 according to the present embodiment of the invention has the low resistance line portion 310 and the high resistance line portion 320. The low resistance line portion 310 of the image signal line 300 is a non-limiting example of a "low resistance portion" according to an aspect of the invention. The high resistance line portion 320 of the image signal line 300 is a non-limiting example of a "high resistance portion" according to an aspect of the invention.

As shown in FIGS. 3 and 5, the low resistance line portion 310 of the image signal line 300 is formed as a part thereof other than the high resistance line portion 320 thereof, which will be described in detail later.

As illustrated in FIGS. 5 and 6, the low resistance line portion 310 of the image signal line 300 is made up of an upper electric line layer (i.e., upper electric wire layer) 310*a* and a lower electric line layer (i.e., lower electric wire layer) 310*b*. The upper electric line layer 310*a* of the low resistance line portion 310 of the image signal line 300 is made of the same film as that of the image signal terminal 102*v*, which is made of an aluminum film. On the other hand, the lower electric line layer 310*b* of the low resistance line portion 310 of the image signal line 300 is made of the same film as that of a relay layer 910, which is also made of an aluminum film. As further illustrated therein, a second inter-bedded insulation film (i.e., interlayer insulation film; the same applies hereafter) 42 is deposited between the image signal terminal 102*v*, which is formed in an upper layer, and the relay layer 910, which is formed in a lower layer. The upper electric line layer 310*a* of the low resistance line portion 310 of the image signal line 300 and the lower electric line layer 310*b* thereof are electrically connected to each other via contact holes 81 each of which is formed through the second inter-bedded insulation film 42. As will be understood from the above explanation, the low resistance line portion 310 of the image signal line 300 has a duplex line structure, or, in other words, a bi-layer structure that is made up of the upper electric line layer 310*a* and the lower electric line layer 310*b* that are electrically connected to each other. The low resistance line portion 310 of the image signal line 300 is formed at some region (i.e., area) of the aforementioned peripheral region over the TFT array substrate 10. More specifically, as shown in FIG. 5, the low resistance line portion 310 of the image signal line 300 is formed at some region at which the image signal terminal 102*v* is not formed. This means that the low resistance line portion 310 of the image signal line 300 does not overlap the image signal terminal 102*v* when viewed in plan over the TFT array substrate 10.

In the context of the description of this specification and the recitation of appended claims (if claimed up in the later prosecution of the subject application), the term "same film" means two (or more) films that are formed concurrently with each other (or one another) in the same single film formation process. Thus, it means the same single kind of film. It should be noted that, in the context of the description of this specification and the recitation of appended claims (if claimed up in the later prosecution of the subject application), the phrase "is made of the same film" does not restrictively mean that two (or more) elements are formed together as a single sheet of film having a "non-isolated pattern". The phrase "is made of the same film" also applies two (or more) elements that are isolated (i.e., have an isolated pattern) from each other (or one another) though they constitute the same single kind of film.

The image signal terminal 102*v* is made of an aluminum film that is deposited over the second inter-bedded insulation film 42. A third inter-bedded insulation film 43 is formed so as to overlie the aluminum film, that is, the image signal terminal 102. The third inter-bedded insulation film 43 has an opening 1510 that is formed therethrough (i.e., through the third inter-bedded insulation film 43). A part of the image signal terminal 102*v* is exposed at the opening 1510 of the third inter-bedded insulation film 43.

The aforementioned control-signal terminal 102*s* has substantially the same layout and structure as those of the image-signal terminal 102*v* explained above. In addition, each of the aforementioned test terminals 103*i*, 103*o*, 103*nc*, and 103*y* has substantially the same layout and structure as those of the image signal terminal 102*v* explained above. That is, the control signal terminal 102*s* is made of an aluminum film that is deposited over the second inter-bedded insulation film 42. The third inter-bedded insulation film 43 is formed so as to overlie the aluminum film. A part of the control signal terminal 102*s* is exposed at the opening (1510) of the third inter-bedded insulation film 43, which is formed in such a manner that it penetrates through the third inter-bedded insulation film 43. In like manner, the test terminal 103*i* is made of an aluminum film that is deposited over the second inter-bedded insulation film 42. The third inter-bedded insulation film 43 is formed so as to overlie the aluminum film. A part of the test terminal 103*i* is exposed at the opening (1510) of the third inter-bedded insulation film 43, which is formed in such a manner that it penetrates through the third inter-bedded insulation film 43. The same layout and structure, or at least similar thereto, apply for each of the remaining test terminals 103*o*, 103*nc*, and 103*y*.

On the other hand, the high resistance line portion 320 of the image signal line 300 is formed in a layer below the relay layer 910. A first inter-bedded insulation film 41 is formed between the upper-layer relay layer 910 and the lower-layer high resistance line portion 320 of the image signal line 300. The high resistance line portion 320 of the image signal line 300 is formed so as to overlie an underlying insulation film (i.e., ground insulator film) 12, which is deposited over the TFT array substrate 10. The high resistance line portion 320 of the image signal line 300 is made of conductive polysilicon. As shown in FIG. 5, a contact hole 82 is formed through the first inter-bedded insulation film 41. The high resistance line portion 320 of the image signal line 300 is electrically connected to the low resistance line portion 310 thereof via the contact hole 82. The high resistance line portion 320 of the image signal line 300 is indirectly connected to the image signal terminal 102*v* through an electric relay layer structure that is made up of the relay layer 910 as well as the contact holes 83 and 84. More specifically, as shown in FIG. 6, the high resistance line portion 320 of the image signal line 300 is electrically connected to the relay layer 910 via the contact hole 84, which is formed through the first inter-bedded insulation film 41. The relay layer 910 is electrically connected to the image signal terminal 102*v* through the contact hole(s) 83, which is formed through the second inter-bedded insulation film 42. Or, in other words, the relay layer 910 provides electric relay connection between the high resistance line portion 320 of the image signal line 300 and the image signal terminal 102*v*.

A dummy film 920 is formed at a part of an image-signal-terminal overlapping region (i.e., overlapping area) in the high-resistance-line-portion (320) layer at which the image signal terminal 102*v* is formed when viewed in plan. The dummy film 920 is made of the same film as that of the high resistance line portion 320 of the image signal line 300. As shown in FIG. 6, a contact hole 85 is formed through the first inter-bedded insulation film 41. The dummy film 920 is electrically connected to the relay layer 910 via the contact hole 85.

The high resistance line portion 320 of the image signal line 300, which is made of a conductive polysilicon film, has a resistance value that is higher than that of the low resistance line portion 310 thereof, which has the duplex line (i.e., bi-layer) structure made of an aluminum film. That is, the high resistance line portion 320 of the image-signal line 300 provides an additional resistance to that offered by the low resistance line portion 310 thereof. Since the image signal line 300 has a pattern, layout, and structure explained above, an image signal that is applied to the image signal terminal 102v flows through the high resistance line portion 320 of the image signal line 300 before it is supplied to the aforementioned demultiplexer 7. Therefore, the high resistance line portion 320 of the image signal line 300 makes it possible to completely prevent any excessive voltage from being applied to the demultiplexer 7, which is electrically connected to each of the plurality of image signal lines 300, or at least substantially reduce the risk thereof. For example, even if electrostatic charges are generated near the liquid crystal device 100 and then applied to any image signal line 300 thereof without any intention to do so, which might occur accidentally during the assembly of the liquid crystal device 100, during the testing thereof, or during the shipment thereof or other transportation thereof, the high resistance line portion 320 of the image signal line 300 makes it possible to completely prevent any excessive voltage from being applied to the demultiplexer 7, which is electrically connected to each of the plurality of image signal lines 300, or at least substantially reduce the risk thereof. More specifically, the high resistance line portion 320 of the image signal line 300 makes it possible to, even when such electrostatic charges are applied thereto, completely prevent any excessive voltage from being applied to any of the TFTs 71 of the demultiplexer 7, the source electrodes of each group of which are common-connected to the corresponding image signal line 300, or at least substantially reduce the risk thereof. Therefore, it is possible to completely prevent the demultiplexer 7 from being damaged due to electrostatic charges that are applied to any image signal line 300, or at least substantially reduce the risk thereof. Or, in other words, the high resistance line portion 320 of the image signal line 300 functions as an electrostatic protection resistor, which protects the demultiplexer 7 against any electrostatic damage. Thus, the high resistance line portion 320 of the image signal line 300 significantly improves the electrostatic resistance of the liquid crystal device 100.

In the configuration of the liquid crystal device 100 according to the present embodiment of the invention, as shown in FIG. 5, a part of the high resistance line portion 320 of the image signal line 300 has a winding layout (e.g., winding pattern) in the aforementioned image-signal-terminal overlapping region of the peripheral region at which the image signal terminal 102v is formed when viewed in plan. More specifically, in the configuration of the liquid crystal device 100 according to the present embodiment of the invention, as shown in FIG. 5, a part of the high resistance line portion 320 of the image signal line 300 has a meandering layout (e.g., meandering pattern) in the image-signal-terminal overlapping region of the peripheral region at which the image signal terminal 102v is formed when viewed in plan. The high resistance line portion 320 of the image signal line 300 has a wiring 321 including a plurality of straight portions connected to each other by turnarounds (switchbacks). In the example of FIG. 5, the straight portions extend substantially parallel to each other and the turnarounds are substantially perpendicular to the straight portions. Note that the "straight portions" and the turnarounds could be slightly curved. The wiring 321 of the high resistance line portion 320 of the image signal line 300 has a pattern that overlaps the image signal terminal 102v when viewed in plan over the TFT array substrate 10. That is, when viewed in plan over the TFT array substrate 10, the wiring 321 of the high resistance line portion 320 of the image signal line 300 meanders in the image-signal-terminal overlapping region of the peripheral region at which the image signal terminal 102v is formed so that the resistance value of the high resistance line portion 320 of the image signal line 300 approximates to a predetermined resistance value. Or, in other words, when viewed in plan over the TFT array substrate 10, since the wiring 321 of the high resistance line portion 320 of the image signal line 300 has a meandering layout inside the image-signal-terminal overlapping region of the peripheral region at which the image signal terminal 102v is formed, it (i.e., the meandering pattern of the wiring 321) increases the resistance value of the high resistance line portion 320 of the image signal line 300. For this reason, it is possible to reduce the area (i.e., area size) of other part of the high resistance line portion 320 of the image signal line 300 that is patterned in a remaining peripheral region excluding the image-signal-terminal overlapping region of the peripheral region at which the image signal terminal 102v is formed, when viewed in plan over the TFT array substrate 10, which is required so as to ensure that the high resistance line portion 320 of the image signal line 300 has a predetermined resistance value. That is, while ensuring that the high resistance line portion 320 of the image signal line 300 has a predetermined resistance value, it is possible to reduce the area of other part of the high resistance line portion 320 of the image signal line 300 that is patterned in the image-signal-terminal "non-overlapping" region of the peripheral region at which the image signal terminal 102v is not formed when viewed in plan over the TFT array substrate 10. This means that it is possible to make the pattern size of other portion (e.g., non-meandering portion, though not limited thereto) 322 of the high resistance line portion 320 of the image signal line 300 smaller; herein, the other portion (i.e., other part) 322 of the high resistance line portion 320 of the image signal line 300 is patterned in the above-mentioned remaining peripheral region excluding the image-signal-terminal overlapping region of the peripheral region at which the image signal terminal 102v is formed when viewed in plan over the TFT array substrate 10. Or, in other words, it is possible to reduce the layout area of the other portion 322 of the high resistance line portion 320 of the image signal line 300. Since it is possible to reduce the layout area of the other portion 322 of the high resistance line portion 320 of the image signal line 300, it is further possible to make the area size of the peripheral region smaller relative to the area size of the image display region 10a when viewed in plan over the TFT array substrate 10. This makes it further possible to reduce the size of the TFT array substrate 10 without narrowing the image display area 10a. Or, in other words, it is possible to "shrink" the size/structure of the TFT array substrate 10. Thus, thanks to the unique layout/pattern/structure of the high resistance line portion 320 of the image signal line 300 explained above, the liquid crystal device 100 according to the present embodiment of the invention has a reduced size, which is advantageous.

The control signal line 700, which is included in the winding electric wiring pattern 90 as explained while referring to FIG. 3, has a pattern/layout/structure that is the same as or similar to that of the image signal line 300. That is, each of the plurality of control signal lines 700 according to the present embodiment of the invention has the aforementioned low resistance line portion 710 and the aforementioned high resistance line portion 720. The low resistance line portion 710 of the control signal line 700 is made up of an upper electric line layer (i.e., upper electric wire layer) and a lower electric line layer (i.e., lower electric wire layer). The upper electric line layer of the low resistance line portion 710 of the control signal line 700 is made of the same film as that of the upper electric line layer 310a of the low resistance line portion 310 of the image signal line 300. On the other hand, the lower electric line layer of the low resistance line portion 710 of the control signal line 700 is made of the same film as that of the lower electric line layer 310b of the low resistance line portion 310 of the image signal line 300. The second inter-bedded insulation film 42 is deposited between the upper electric line layer of the low resistance line portion 710 of the control signal line 700 and the lower electric line layer thereof. The upper electric line layer of the low resistance line portion 710 of the control signal line 700 and the lower electric line layer thereof are electrically connected to each other via contact holes each of which is formed through the second inter-bedded insulation film 42. As will be understood from the above explanation, the low resistance line portion 710 of the control signal line 700 has a duplex line structure, or, in other words, a bi-layer structure that is made up of the upper electric line layer and the lower electric line layer that are electrically connected to each other. On the other hand, the high resistance line portion 720 of the control signal line 700 is made of the same film as that of the high resistance line portion 320 of the image signal line 300. The high resistance line portion 720 of the control signal line 700 is electrically connected to the low resistance line portion 710 thereof at its one end. The high resistance line portion 720 of the control signal line 700 is electrically connected to the control signal terminal 102s at its other end. In the configuration of the liquid crystal device 100 according to the present embodiment of the invention, a part of the high resistance line portion 720 of the control signal line 700 has a winding layout (e.g., winding pattern) in the control-signal-terminal overlapping region of the peripheral region at which the control signal terminal 102s is formed when viewed in plan. Therefore, it is possible to make the area size of the peripheral region smaller relative to the area size of the image display region 10a when viewed in plan over the TFT array substrate 10. This makes it further possible to reduce the size of the TFT array substrate 10 without narrowing the image display area 10a.

Next, with reference to FIGS. 7, 8, 9, and 10 as well as FIG. 3, an explanation is given of the specific layout and structure of a winding electric wiring pattern (91) that is electrically connected to a plurality of test terminals (103) in the configuration of the liquid crystal device 100 according to the present embodiment of the invention. In addition, in the following description of this specification, one of the test signal lines 810 is taken as an example of a plurality of winding electric wires/lines that make up the winding electric wiring pattern 91. Note that each of the plurality of the test signal lines 810 is electrically connected to the corresponding one of the plurality of the test terminals 103i (or test terminal 103nc) among the plurality of test terminals 103. Any electric wire/line component of the winding electric wiring pattern 91 other than the above-mentioned test signal line 810 has substantially the same layout and structure as those of the test signal line 810. For example, the aforementioned test signal lines 820 and 830, each of which is included in the winding electric wiring pattern 91, has a pattern/layout/structure that is the same as or similar to that of the test signal line 810.

Figure 7:
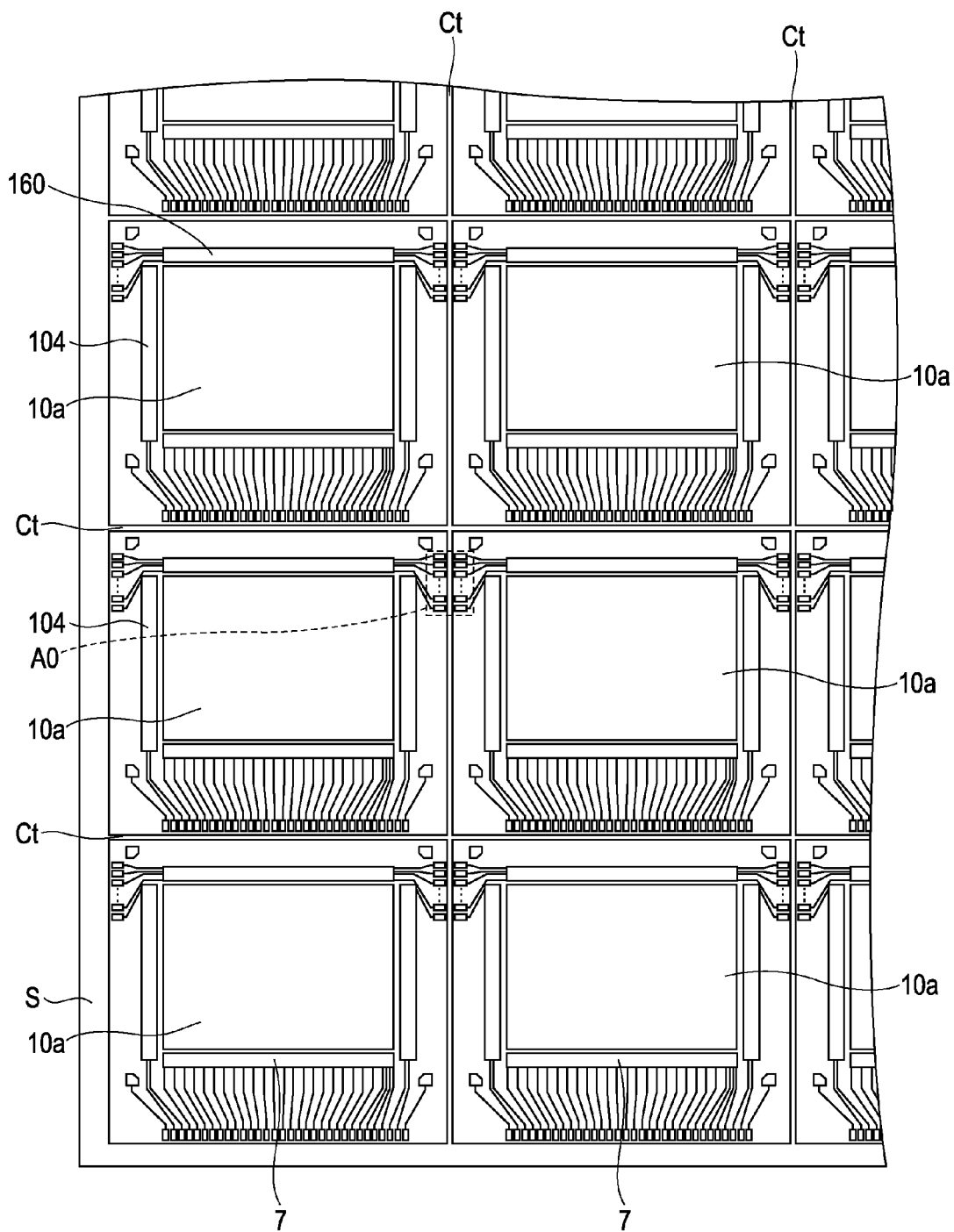
FIG. 7 is a partial plan view that schematically illustrates an example of the configuration of uncut liquid crystal devices according to the first exemplary embodiment of the invention, which are formed on a single mother substrate as half-finished products in the production process thereof.
Figure 8:
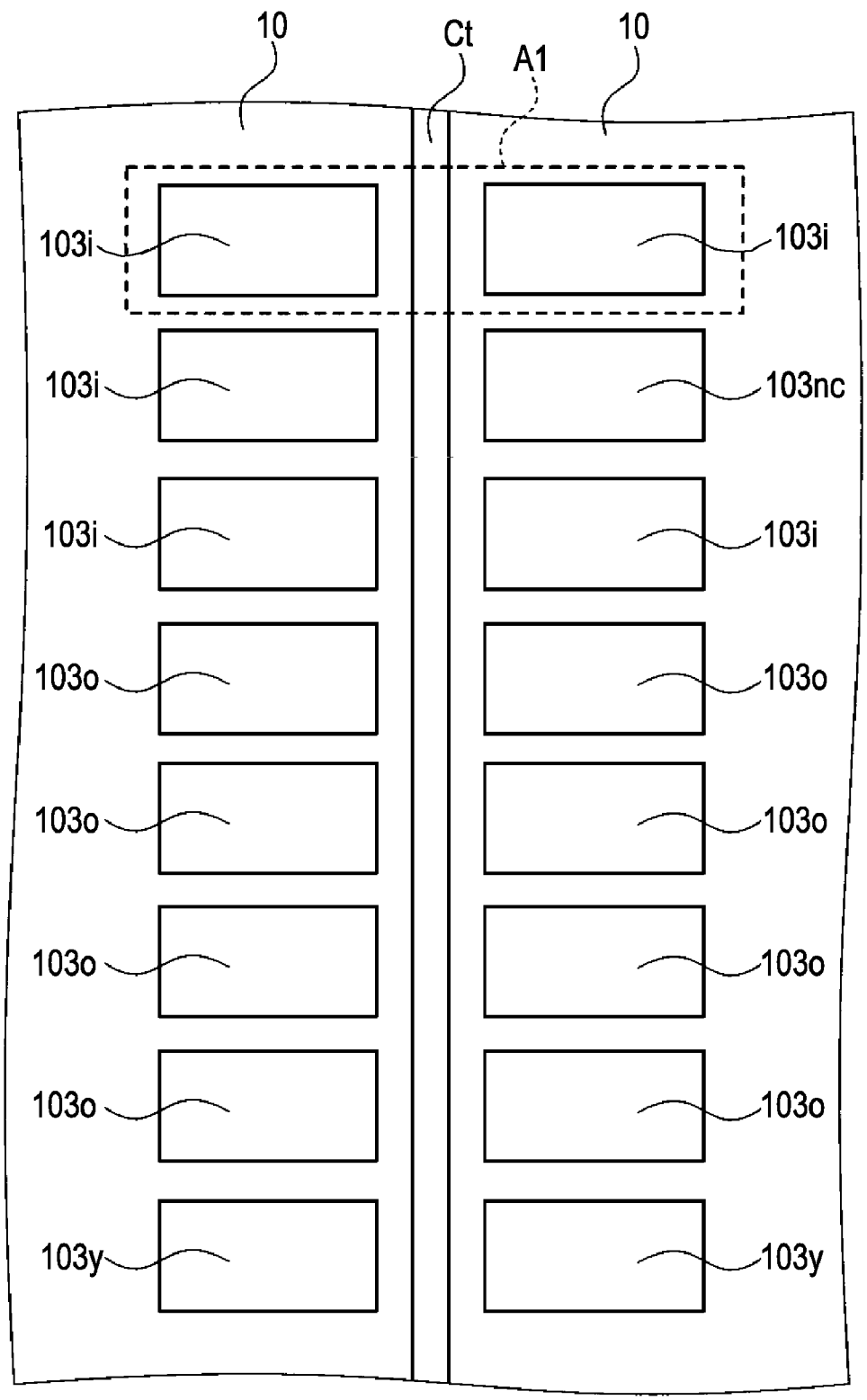
FIG. 8 is a partially enlarged plan view that schematically illustrates an example of a part of the configuration of half-finished (i.e., undivided) liquid crystal devices shown in FIG. 7; or, more specifically.

First of all, with reference to FIGS. 7 and 8, the layout positions of the test terminals of the liquid crystal device 100 according to the present embodiment of the invention are explained below. FIG. 7 is a partial plan view that schematically illustrates an example of the configuration of uncut liquid crystal devices according to the present embodiment of the invention, which are formed on a single mother substrate as half-finished products in the production process thereof. FIG. 8 is a partially enlarged plan view that schematically illustrates an example of a part of the configuration of half-finished (i.e., undivided) liquid crystal devices shown in FIG. 7; or, more specifically, FIG. 8 illustrates, in a partial close-up plan view, a test terminal area shown as a dotted box A0 in FIG. 7.

As shown in FIG. 7, a plurality of liquid crystal devices 100 according to the present embodiment of the invention is formed on a single mother substrate S in the manufacturing process thereof. The plurality of liquid crystal devices 100 is formed in a matrix array layout made up of a plurality of rows and a plurality of columns over the single mother substrate S. Various kinds of TFT-array-substrate-side elements/components/lines/patterns/members including but not limited to the plurality of pixel-switching TFTs 30, the plurality of scanning lines 11a, the plurality of data lines 6a, the scanning line driving circuit(s) 104, the demultiplexer 7, and the test circuit 160, which have already been described earlier while referring to FIGS. 1, 2, 3, and 4, are formed in each of the plurality of liquid crystal devices 100 arrayed in a matrix over the single mother substrate S.

The single mother substrate S shown in FIG. 7 has a plurality of TFT array substrates 10 shown in FIGS. 1 and 2. Various kinds of TFT-array-substrate-side elements/components/lines/patterns/members as those enumerated above without any limitation thereto are formed over the single mother substrate S shown in FIG. 7. On the other hand, the counter electrode 21 and the aforementioned orientation film, though not limited thereto, are formed over another glass substrate that is not shown in FIG. 7. A plurality of counter substrates 20 is formed over the above-mentioned glass substrate that is not shown in FIG. 7. Then, the plurality of counter substrates 20 that is formed over the above-mentioned glass substrate is divided (e.g., scribed and then broken, though not limited thereto) into a plurality of individual counter substrates 20. Each of the plurality of divided counter substrates 20 is arrayed opposite to the corresponding one of the plurality of TFT array substrates 10 formed over the single mother substrate S, thereby making a plurality of pairs thereof. Next, each of the plurality of divided counter substrates 20 and the corresponding one of the plurality of TFT array substrates 10 formed over the single mother substrate S are adhered to each other on a one-to-one basis by means of the aforementioned sealant material 52. Subsequently, liquid crystal is injected into a space between each pair of the TFT array substrate 10 and the counter substrate 20 in such a manner that it is sealed therebetween. Thereafter, the single mother substrate S is divided into a plurality of substrate pieces. In this way, the liquid crystal device 100 according to the present embodiment of the invention, a non-limiting example of which is shown in FIGS. 1 and 2, is manufactured.

As illustrated in FIGS. 7 and 8, a cut region (i.e., cut area) Ct is formed around the contour of (i.e., at the periphery of) each of the plurality of TFT array substrates 10 formed in a matrix array over the single mother substrate S. The single mother substrate S is divided into a plurality of substrate pieces as a result of dicing or scribing the cut region Ct thereof.

The plurality of test terminals 103 shown in the enlarged view of FIG. 8, which is made up of the test terminals 103i, 103o, 103nc, and 103y, are arrayed along each of the vertical sides outside the sealing region 52a in the peripheral region over the TFT array substrate 10. As has already been explained earlier while referring to FIG. 1, the plurality of test terminals 103 is arrayed in a line at each vertical peripheral region to the left/right of the image display area 10a over the TFT array substrate 10. Therefore, the test terminals 103 that are formed at one vertical side region of one TFT array substrate 10 and the test terminals 103 that are formed at one (which is adjacent to the above-mentioned one vertical side region) vertical side region of another TFT array substrate 10 that is formed adjacent to the above-mentioned one TFT array substrate 10 are arrayed adjacent to each other with the cut region Ct being interposed therebetween.

For example, as illustrated in FIG. 8 (and as will be understood from FIG. 7), eight test terminals 103 that are formed at the right side region of the left TFT array substrate 10 and eight test terminals 103 that are formed at the left side region of the right TFT array substrate 10 that is formed adjacent to the above-mentioned left TFT array substrate 10 are arrayed adjacent to each other with the cut region Ct being interposed therebetween.

Figure 9:
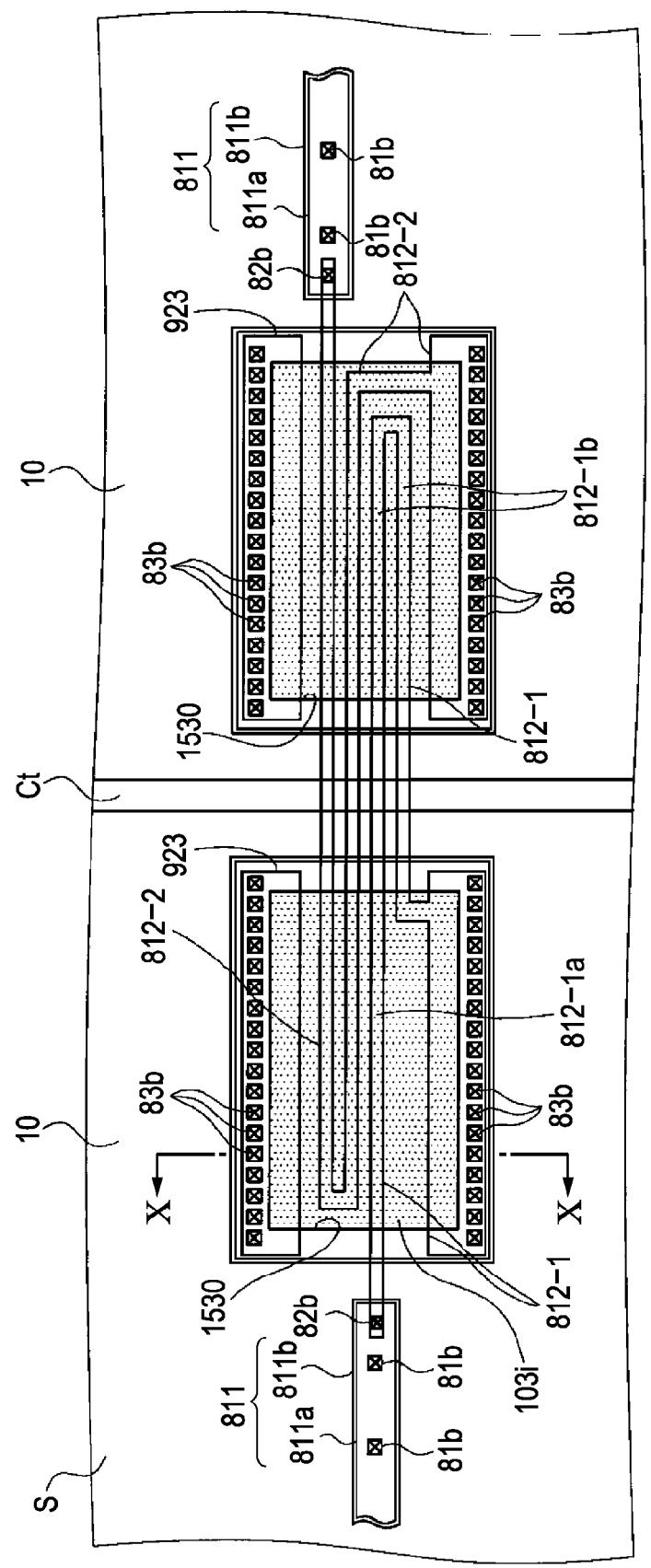
FIG. 9 is a partially enlarged plan view that schematically illustrates an example of a part of the configuration of the test terminal area (shown in FIG. 8) of the undivided liquid crystal devices according to the first exemplary embodiment of the invention (shown in FIG. 7); or, more specifically.
Figure 10:
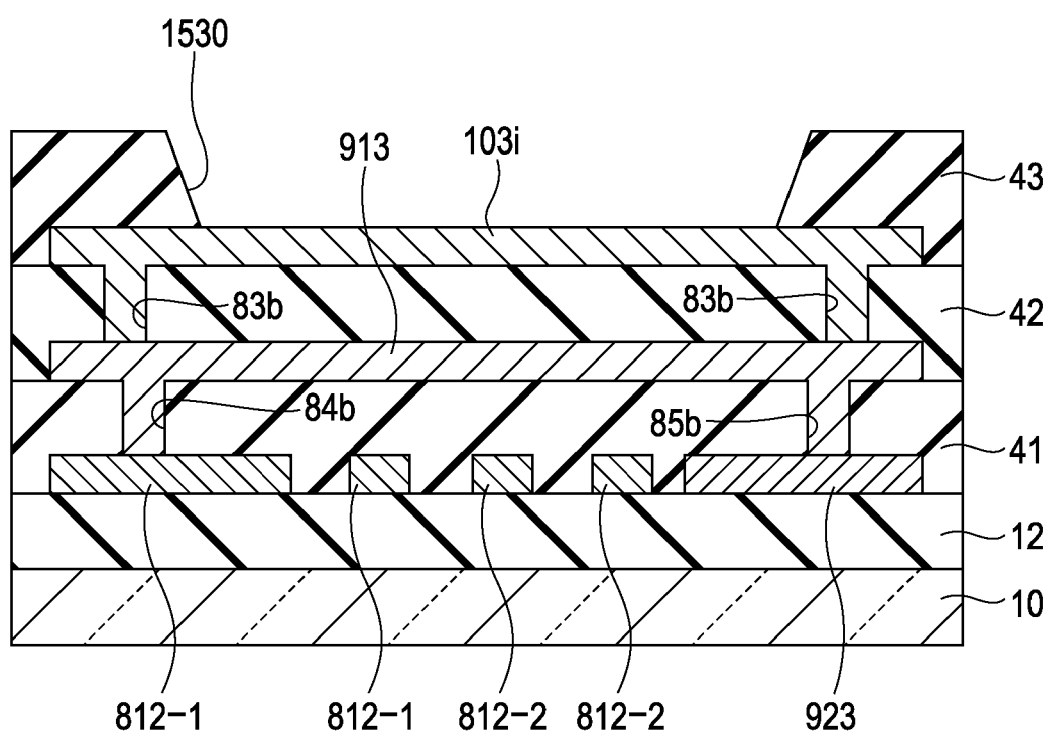
FIG. 10 is a sectional view taken along the line X-X of FIG. 9.

Next, with reference to FIGS. 9 and 10 as well as FIG. 3, an explanation is given of the specific layout and structure of the test signal line 810 in the configuration of the liquid crystal device 100 according to the present embodiment of the invention. FIG. 9 is a partially enlarged plan view that schematically illustrates an example of a part of the configuration of the test terminal area (shown in FIG. 8) of the undivided liquid crystal devices according to the present embodiment of the invention (shown in FIG. 7); or, more specifically, FIG. 9 illustrates, in a partial close-up plan view, two test terminals 103i (and two test signal lines 810) shown as a dotted box Al in FIG. 8. FIG. 10 is a sectional view taken along the line X-X of FIG. 9.

As illustrated in FIGS. 3, 9, and 10, each of the plurality of test signal lines 810 according to the present embodiment of the invention has the low resistance line portion 811 and the high resistance line portion 812. Two test signal lines 810 are illustrated in FIGS. 9 and 10. In these drawings, the high resistance line portion 812 of one of these two test signal lines 810 that is electrically connected to the (i.e., one) test terminal 103i provided on the left TFT array substrate 10 is shown as the high resistance line portion 812-1. On the other hand, the reference numeral 812-2 is assigned to the high resistance line portion 812 of the other of these two test signal lines 810 that is electrically connected to the (i.e., the other) test terminal 103i provided on the right TFT array substrate 10.

The low resistance line portion 811 of the test signal line 810 is a non-limiting example of a "low resistance portion" according to an aspect of the invention. The high resistance line portion 812 of the test signal line 810 is a non-limiting example of a "high resistance portion" according to an aspect of the invention.

As shown in FIGS. 3 and 9, the low resistance line portion 811 of the test signal line 810 is formed as a part thereof other than the high resistance line portion 812 thereof, which will be described in detail later.

As illustrated in FIGS. 9 and 10, the low resistance line portion 811 of the test signal line 810 is made up of an upper electric line layer (i.e., upper electric wire layer) 811a and a lower electric line layer (i.e., lower electric wire layer) 811b. The upper electric line layer 811a of the low resistance line portion 811 of the test signal line 810 is made of the same film as that of the test terminal 103i, which is made of an aluminum film. On the other hand, the lower electric line layer 811b of the low resistance line portion 811 of the test signal line 810 is made of the same film as that of a relay layer 913, which is also made of an aluminum film. As further illustrated therein, the second inter-bedded insulation film 42 is deposited between the test terminal 103i, which is formed in an upper layer, and the relay layer 913, which is formed in a lower layer. The upper electric line layer 811a of the low resistance line portion 811 of the test signal line 810 and the lower electric line layer 811b thereof are electrically connected to each other via contact holes 81b each of which is formed through the second inter-bedded insulation film 42. As will be understood from the above explanation, the low resistance line portion 811 of the test signal line 810 has a duplex line structure, or, in other words, a bi-layer structure that is made up of the upper electric line layer 811a and the lower electric line layer 811b that are electrically connected to each other. The low resistance line portion 811 of the test signal line 810 is formed at some region (i.e., area) of the aforementioned peripheral region over the TFT array substrate 10. More specifically, as shown in FIG. 9, the low resistance line portion 811 of the test signal line 810 is formed at some region at which the test terminal 103i is not formed. This means that the low resistance line portion 811 of the test signal line 810 does not overlap the test terminal 103i when viewed in plan over the TFT array substrate 10.

The test terminal 103i is made of an aluminum film that is deposited over the second inter-bedded insulation film 42. The third inter-bedded insulation film 43 is formed so as to overlie the aluminum film, that is, the test terminal 103i. The third inter-bedded insulation film 43 has an opening 1530 that is formed therethrough (i.e., through the third inter-bedded insulation film 43). A part of the test terminal 103i is exposed at the opening 1530 of the third inter-bedded insulation film 43.

On the other hand, the high resistance line portion 812 of the test signal line 810, that is, each of the high resistance line portions 812-1 and 812-2, is formed in a layer below the relay layer 913. The first inter-bedded insulation film 41 is formed between the upper-layer relay layer 913 and the lower-layer high resistance line portion 812 (i.e., 812-1, 812-2) of the test signal line 810. The high resistance line portion 812 (i.e., 812-1, 812-2) of the test signal line 810 is formed so as to overlie the underlying insulation film (i.e., ground insulator film) 12, which is deposited over the TFT array substrate 10. The high resistance line portion 812 (i.e., 812-1, 812-2) of the test signal line 810 is made of a conductive polysilicon film. As shown in FIG. 9, a contact hole 82b is formed through the first inter-bedded insulation film 41. The high resistance line portion 812 of the test signal line 810 is electrically connected to the low resistance line portion 811 thereof via the contact hole 82b. The high resistance line portion 812 of the test signal line 810 is indirectly connected to the test terminal 103i through an electric relay layer structure that is made up of the relay layer 913 as well as the contact holes 83b and 84b. More specifically, as shown in FIG. 10, the high resistance line portion 812 of the test signal line 810 is electrically connected to the relay layer 913 via the contact hole 84b, which is formed through the first inter-bedded insulation film 41. The relay layer 913 is electrically connected to the test terminal 103i through the contact hole(s) 83b, which is formed through the second inter-bedded insulation film 42. Or, in other words, the relay layer 913 provides electric relay connection between the high resistance line portion 812 of the test signal line 810 and the test terminal 103i.

A dummy film 923 is formed at a part of a test-terminal overlapping region (i.e., overlapping area) in the high-resistance-line-portion (812) layer at which the test terminal 103i is formed when viewed in plan. The dummy film 923 is made of the same film as that of the high resistance line portion 812 of the test signal line 810. As shown in FIG. 10, a contact hole 85b is formed through the first inter-bedded insulation film 41. The dummy film 923 is electrically connected to the relay layer 913 via the contact hole 85b.

The high resistance line portion 812 of the test signal line 810, which is made of a conductive polysilicon film, has a resistance value that is higher than that of the low resistance line portion 811 thereof, which has the duplex line (i.e., bi-layer) structure made of an aluminum film. That is, the high resistance line portion 812 of the test-signal line 810 provides an additional resistance to that offered by the low resistance line portion 811 thereof. Therefore, the high resistance line portion 812 of the test signal line 810 makes it possible to completely prevent any excessive voltage from being applied to the test circuit 160, which is electrically connected to each of the plurality of test signal lines 810, or at least substantially reduce the risk thereof. For example, even if electrostatic charges are generated near one of the plurality of liquid crystal devices 100 that are formed over the single mother substrate S and then applied to any test signal line 810 thereof without any intention to do so, which might occur accidentally during the testing of the liquid crystal device 100 or during any other manufacturing process prior to, for example, the scribe-and-break process, the high resistance line portion 812 of the test signal line 810 makes it possible to completely prevent any excessive voltage from being applied to the test circuit 160, which is electrically connected to each of the plurality of test signal lines 810, or at least substantially reduce the risk thereof. More specifically, the high resistance line portion 812 of the test signal line 810 makes it possible to, even when such electrostatic charges are applied thereto, completely prevent any excessive voltage from being applied to any of the TFTs of the control circuit 162 of the test circuit 160 or at least substantially reduce the risk thereof. Therefore, it is possible to completely prevent the test circuit 160 from being damaged due to electrostatic charges that are applied to any test signal line 810, or at least substantially reduce the risk thereof.

As illustrated in the plan view of FIG. 9, a part of the test signal terminal 810 according to the present embodiment of the invention is formed in the cut region Ct mentioned above. Therefore, at the time when the single mother substrate S is divided into the plurality of TFT array substrates 10, the test signal line 810 is broken at the cut region Ct. Since the test signal line 810 is broken at the cut region Ct at the time when the single mother substrate S is divided into the plurality of liquid crystal devices 100, it is possible to perfectly prevent, after the division (e.g., dicing, scribing, and breaking, though not limited thereto) thereof, any electrostatic charges that are accidentally applied to the test terminal 103*i* from reaching the test circuit 160 through the test signal line 810.

In the configuration of the liquid crystal device 100 according to the present embodiment of the invention, as shown in FIG. 9, the high resistance line portion 812 of the test signal line 810 is partially formed in the aforementioned test-terminal overlapping region of the peripheral region at which the test terminal 103*i* is formed so as to make up a winding layout (e.g., winding pattern) when viewed as a whole in plan. The winding layout of the high resistance line portion 812 of the test signal line 810 is explained in detail in this paragraph. In the following description, our attention is focused on/directed to the high resistance line portion 812 of one of the above-explained two test signal lines 810 shown in FIGS. 9 and 10 that is electrically connected to the (i.e., one) test terminal 103*i* provided on the left one of arbitrary two TFT array substrates 10 that are formed adjacent to each other on the single mother substrate S, which is denoted as the high resistance line portion 812-1. In the configuration of the liquid crystal device 100 according to the present embodiment of the invention, as shown in FIG. 9, some part of the high resistance line portion 812-1 of the test signal line 810 is formed inside one test-terminal overlapping region of the peripheral region at which the test terminal 103*i* to which the high resistance line portion 812-1 of the test signal line 810 is electrically connected is formed when viewed in plan. It should be noted that the above-mentioned test terminal 103*i* to which the high resistance line portion 812-1 of the test signal line 810 is electrically connected is provided on the left TFT array substrate 10. In addition, as further illustrated therein, other part of the high resistance line portion 812-1 of the test signal line 810 is formed inside the other test-terminal overlapping region of the peripheral region at which the test terminal 103*i* to which the high resistance line portion 812-1 of the test signal line 810 is not electrically connected is formed when viewed in plan. It should be noted that the above-mentioned test terminal 103*i* to which the high resistance line portion 812-1 of the test signal line 810 is not electrically connected is provided on the right TFT array substrate 10. Or, in other words, in the configuration of the liquid crystal device 100 according to the present embodiment of the invention, the above-mentioned other part of the high resistance line portion 812-1 of the test signal line 810 is formed inside the above-mentioned other test-terminal overlapping region of the peripheral region at which the test terminal 103*i* to which the high resistance line portion 812-2 of the test signal line 810 is electrically connected is formed when viewed in plan. More specifically, some part 812-1*a* of the high resistance line portion 812-1 of the test signal line 810 has a pattern that overlaps, when viewed in plan over the TFT array substrate 10, the test terminal 103*i* to which the high resistance line portion 812-1 of the test signal line 810 is electrically connected. On the other hand, other part 812-1*b* of the high resistance line portion 812-1 of the test signal line 810 has a pattern that overlaps, when viewed in plan over the TFT array substrate 10, the test terminal 103*i* to which the high resistance line portion 812-1 of the test signal line 810 is not electrically connected. That is, the above-mentioned other part 812-1*b* of the high resistance line portion 812-1 of the test signal line 810 has a pattern that overlaps, when viewed in plan over the TFT array substrate 10, the (i.e., the other) test terminal 103*i* provided on the right one of arbitrary two TFT array substrates 10, which is formed on the single mother substrate S next to the left one thereof on which the (i.e., one) test terminal 103*i* to which the high resistance line portion 812-1 of the test signal line 810 is electrically connected is provided. Or, in other words, the high resistance line portion 812-1 of the test signal line 810 has the above-mentioned some part 812-1*a* that is formed to overlap, when viewed in plan over the TFT array substrate 10, the test terminal 103*i* that is provided on the left one of arbitrary two TFT array substrates 10 that are formed adjacent to each other on the single mother substrate S and further has the above-mentioned other part 812-1*b* that is formed to overlap, when viewed in plan over the TFT array substrate 10, the test terminal 103*i* that is provided on the right one thereof; herein, these two test terminals 103*i* are arrayed adjacent to each other with the cut region Ct being interposed therebetween. That is, when viewed in plan over the TFT array substrate 10, each of the above-mentioned some part 812-1*a* of the high resistance line portion 812-1 of the test signal line 810 and the above-mentioned other part 812-1*b* thereof is formed in the corresponding test-terminal overlapping region of the peripheral region at which the test terminal 103*i* is formed so that the resistance value of the high resistance line portion 812-1 of the test signal line 810 approximates to a predetermined resistance value. Or, in other words, when viewed in plan over the TFT array substrate 10, since the above-mentioned some part 812-1*a* of the high resistance line portion 812-1 of the test signal line 810 and the above-mentioned other part 812-1*b* thereof make up a winding pattern (e.g., circuitous pattern, though not limited thereto), the resistance value of the high resistance line portion 812-1 of the test signal line 810 is heightened. For this reason, it is possible to reduce the area (i.e., area size) of still other part (which is not the above-mentioned some part 812-1*a* or the above-mentioned other part 812-1*b*) of the high resistance line portion 812-1 of the test signal line 810 that is patterned in a remaining peripheral region excluding the test-terminal overlapping region of the peripheral region at which the test terminal 103*i* is formed, when viewed in plan over the TFT array substrate 10, which is required so as to ensure that the high resistance line portion 812-1 of the test signal line 810 has a predetermined resistance value. That is, while ensuring that the high resistance line portion 812-1 of the test signal line 810 has a predetermined resistance value, it is possible to reduce the area of still other part of the high resistance line portion 812-1 of the test signal line 810 that is patterned in the test-terminal non-overlapping region of the peripheral region at which the test terminal 103*i* is not formed when viewed in plan over the TFT array substrate 10. Since it is possible to reduce the layout area of the above-mentioned still other part of the high resistance line portion 812-1 of the test signal line 810, which is not the above-mentioned some part 812-1a or the above-mentioned other part 812-1b, it is further possible to make the area size of the peripheral region smaller relative to the area size of the image display region 10a when viewed in plan over the TFT array substrate 10. This makes it further possible to reduce the size of the TFT array substrate 10 without narrowing the image display area 10a. Or, in other words, it is possible to shrink the size/structure of the TFT array substrate 10. Thus, thanks to the unique layout/pattern/structure of the high resistance line portion 812 of the test signal line 810 explained above, the liquid crystal device 100 according to the present embodiment of the invention has a reduced size, which is advantageous.

As explained in detail above, if the configuration of the liquid crystal device 100 according to the present embodiment of the invention is adopted, it is possible to completely prevent the demultiplexer 7, the scanning line driving circuit(s) 104, and the test circuit 160 from being damaged due to electrostatic charges that are applied to terminals, or at least substantially reduce the risk thereof. Moreover, with the novel and non-obvious features of an aspect of the invention, a non-limiting exemplary configuration of which is explained in detail above, it is possible to make the size of the liquid crystal device 100 smaller.

Electronic Apparatus

Figure 11:
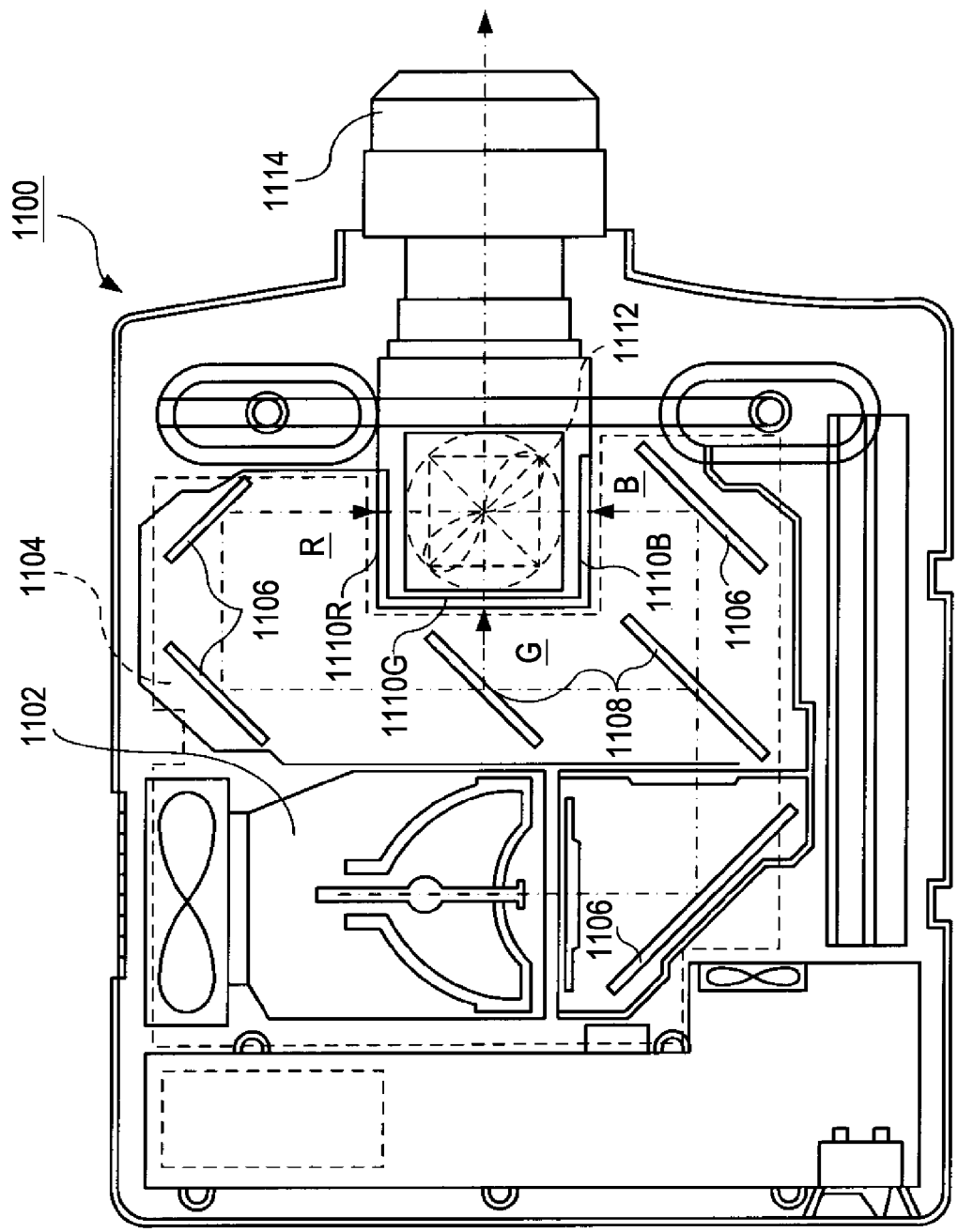
FIG. 11 is a plan view that schematically illustrates an example of the configuration of a projector, which is an example of electronic apparatuses to which an electro-optical device according to an aspect of the invention is applied.

Next, an explanation is given of an example of the applications of a liquid crystal device described above, which is a non-limiting example of an electro-optical device according to an aspect of the invention, to various kinds of electronic apparatuses. In the following description, an explanation is given of a projector that employs the above-described liquid crystal device as a light valve. FIG. 11 is a plan view that schematically illustrates an example of the configuration of a projector.

As illustrated in FIG. 11, a lamp unit 1102, which is made of a white light source such as a halogen lamp, is provided in a projector 1100. A projection light beam that is emitted from the lamp unit 1102 is separated into three primary color components of R, G, and B by four mirrors 1106 and two dichroic mirrors 1108 arranged in a light guide 1104. The separated primary color components of R, G, and B enter liquid crystal panel 1110R, 1110G, and 1110B, respectively, which function as light valves corresponding to the respective primary color components.

The configuration of the liquid crystal panel 1110R, 1110G, or 1110B is the same as or similar to that of the liquid crystal device described above. Each of these liquid crystal panels 1110R, 1110G, and 1110B is driven by the corresponding one of the primary color signals R, G, and B, which are supplied from an image signal processing circuit. Light subjected to optical modulation by one of these liquid crystal panels enters a dichroic prism 1112 from the corresponding one of three directions. Light of R color component and light of B color component are refracted at a 90-degree angle at the dichroic prism 1112, whereas light of G color component goes straight through the dichroic prism 1112. Therefore, as a result of combination of these color components, a color image is projected on a screen, etc., through a projection lens 1114.

Focusing attention on a display image offered by each of the liquid crystal panels 1110R, 1110G, and 1110B, it is necessary to reverse the display image of the liquid crystal panel 1110G in a mirror pattern (that is, to reverse the left side and the right side) with respect to the display images of the liquid crystal panels 1110R and 1110B.

Because light corresponding to each one of the primary colors R, G, and B enters into the corresponding one of the liquid crystal panel 1110R, 1110G, and 1110B thanks to the presence of the dichroic mirror 1108, it is not necessary to provide a color filter thereon.

Among a variety of electronic apparatuses to which the electro-optical device according to an aspect the invention could be embodied are, in addition to the electronic apparatus (projector) explained above with reference to FIG. 11, a mobile-type personal computer, a mobile phone, a liquid crystal display television, a viewfinder-type video recorder, a video recorder of a direct monitor view type, a car navigation device, a pager, an electronic personal organizer, an electronic calculator, a word processor, a workstation, a videophone, a POS terminal, a touch-panel device, and so forth. Needless to say, the invention is also applicable to these various electronic apparatuses without any limitation to those enumerated/mentioned above.

In addition to the liquid crystal device explained in the exemplary embodiments described above, the invention is also applicable to a reflective liquid crystal display which has elements formed on a silicon substrate (LCOS, liquid crystal on silicon), a plasma display (PDP), a field emission display (FED), a surface-conduction electron-emitter display (SED), an organic EL display, a digital micro mirror device (DMD), an electrophoresis apparatus, to name but a few.

The present invention should be in no case interpreted to be limited to the specific embodiments described above. The invention may be modified, altered, changed, adapted, and/or improved within a range not departing from the gist and/or spirit of the invention apprehended by a person skilled in the art from explicit and implicit description given herein as well as recitation of appended claims. An electro-optical device subjected to such modification, alteration, change, adaptation, and/or improvement and an electronic apparatus that is provided with such an electro-optical device are also within the technical scope of the invention.

What is claimed is:

1. An electro-optical device comprising:
a plurality of pixel units arrayed in a pixel area;
a peripheral circuit that is provided in a peripheral area that is formed around the pixel area, the peripheral circuit supplying signals to the plurality of pixel units;
a terminal that is provided in the peripheral area; and
an electric wiring pattern that provides an electric connection between the terminal and the peripheral circuit, the electric wiring pattern having a low resistance portion and a high resistance portion, the high resistance portion having a winding layout that overlaps the terminal in plan view, wherein the high resistance portion is connected to the terminal by a relay layer formed between the high resistance portion and the terminal, with a first series of contact holes formed through a first insulation film formed between the terminal and the relay layer and a second series of contact holes formed through a second insulation film formed between the high resistance portion and the relay layer.

2. The electro-optical device according to claim 1, wherein the terminal is formed as external circuit connection terminal that is electrically connected to an external circuit.

3. The electro-optical device according to claim 1, wherein the terminal is formed as test terminal that is used for either inputting or outputting a test signal for testing whether the electro-optical device is in a good condition or in a bad condition.

4. An electronic apparatus that is provided with the electro-optical device according to claim 1.

* * * * *